United States Patent
Chen et al.

(10) Patent No.: US 12,407,605 B2
(45) Date of Patent: Sep. 2, 2025

(54) PACKET FORWARDING METHOD, APPARATUS, AND SYSTEM

(71) Applicant: Huawei Technologies Co., Ltd., Guangdong (CN)

(72) Inventors: Xia Chen, Beijing (CN); Bing Liu, Beijing (CN); Ling Xu, Beijing (CN); Jianwei Mao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 18/312,198

(22) Filed: May 4, 2023

(65) Prior Publication Data
US 2023/0275830 A1 Aug. 31, 2023

Related U.S. Application Data

(63) Continuation of application No. PCT/CN2022/101268, filed on Jun. 24, 2022.

(30) Foreign Application Priority Data

Jun. 28, 2021 (CN) .......................... 202110722092.4

(51) Int. Cl.
*H04L 45/302* (2022.01)
*H04L 45/741* (2022.01)
(Continued)

(52) U.S. Cl.
CPC .......... *H04L 45/306* (2013.01); *H04L 45/741* (2013.01); *H04L 45/745* (2013.01);
(Continued)

(58) Field of Classification Search
CPC ... H04L 45/306; H04L 45/741; H04L 47/125; H04L 67/1006; H04L 67/565;
(Continued)

(56) References Cited

U.S. PATENT DOCUMENTS

2014/0006578 A1* 1/2014 Kohn ................... H04L 67/1031
709/223
2015/0067027 A1* 3/2015 Liu ....................... H04L 69/161
709/227
(Continued)

FOREIGN PATENT DOCUMENTS

CN 101304436 A 11/2008
CN 103428229 A 12/2013
(Continued)

OTHER PUBLICATIONS

B. Carpenter et al:"Using the IPV6 Flow Label for Server Load Balancing draft-carpenter-flow-label-balancing-00." May 8, 2012. total 12 pages.
(Continued)

*Primary Examiner* — Tonia L Dollinger
*Assistant Examiner* — Joseph M Cousins
(74) *Attorney, Agent, or Firm* — WOMBLE BOND DICKINSON (US) LLP

(57) ABSTRACT

This application discloses a packet forwarding method, an apparatus, and a system, and belongs to the field of communication technologies. The method includes: A first node receives a first packet. The first node sends a second packet to a second node based on the first packet, where a source address of the second packet is obtained by translating a source address of the first packet, a destination address of the second packet is a destination address of the first packet, a packet payload of the second packet is a packet payload of the first packet, the second packet further includes a session identifier, and the session identifier is used by the second node to forward the second packet.

20 Claims, 12 Drawing Sheets

(51) Int. Cl.
  *H04L 45/745* (2022.01)
  *H04L 47/125* (2022.01)
  *H04L 61/256* (2022.01)
  *H04L 67/1006* (2022.01)
  *H04L 67/565* (2022.01)

(52) U.S. Cl.
  CPC .......... *H04L 47/125* (2013.01); *H04L 61/256* (2013.01); *H04L 67/565* (2022.05); *H04L 67/1006* (2013.01)

(58) Field of Classification Search
  CPC ....... H04L 67/146; H04L 45/24; H04L 61/59; H04L 61/2514; H04L 45/121; H04L 45/14
  See application file for complete search history.

(56) References Cited

U.S. PATENT DOCUMENTS

2020/0351309 A1* 11/2020 Warburton .......... H04L 63/0876
2022/0191145 A1* 6/2022 Duraj ...................... H04L 47/29

FOREIGN PATENT DOCUMENTS

EP  2634996 A1  9/2013
EP  3493507 A1  6/2019

OTHER PUBLICATIONS

Carpenter Univ of Auckland S Jiang Huawei Technologies Co B et al: "Using the IPv6 Flow Label for Server Load Balancing; draft-carpenter-flow-label-balancing-02.txt", Internet Engineering Task Force, IETF: Standardworkingdraft, Internet Society (ISOC) 4, Rue Des Falaises CH-1205 Geneva, Switzerland, Dec. 5, 2012 (Dec. 5, 2012), pp. 1-13, XP015088972.

Carpenter Univ of Auckland S Jiang Huawei Technologies Co B et al: "Extending Use of the IPv6 Flow Label for Load Balancing Persistence; draft -tarreau-extend-flow-label-balancing-01 . txt", Internet Engineering Task Force. IETF; Standardworkingoraft, Internet Society (ISOC) 4, Rue Des Falaises CH-1205 Geneva. Switzerla. Dec. 5, 2012 (Dec. 5, 2012), pp. 1-9, XP015088987.

* cited by examiner

PACKET FORWARDING METHOD, APPARATUS, AND SYSTEM

CROSS-REFERENCE TO RELATED APPLICATIONS

This application is a continuation of International Application No. PCT/CN2022/101268 filed on Jun. 24, 2022 which claims priority to Chinese Patent Application No. 202110722092.4, filed on Jun. 28, 2021. The disclosures of the aforementioned applications are hereby incorporated by reference in their entireties.

TECHNICAL FIELD

This application relates to the field of communication technologies, and in particular, to a packet forwarding method, an apparatus, and a system.

BACKGROUND

In a network with a load balancing function, a load balancer node needs to disperse received packets of a plurality of flows to a plurality of target nodes. In this process, the load balancer node needs to perform session persistence. To be specific, application requests from a same user are forwarded to a same serving node, to avoid problems such as traffic interruption, packet loss, and that traffic is randomly sent to a serving node.

Generally, a node in a network implements session persistence and load balancing by using a source address of a packet. However, in some application scenarios, the source address is translated before the packet arrives at a routing node or the load balancer node. As a result, the session persistence and the load balancing that are based on the source address are invalid.

SUMMARY

This application provides a packet forwarding method, an apparatus, and a system. In the method, session persistence and load balancing can be performed based on a session identifier in a packet, to avoid a problem that session persistence and load balancing that are based on a source address are invalid.

According to a first aspect, this application provides a packet forwarding method. The method is performed by a first node, and includes: The first node receives a first packet. The first node sends a second packet to a second node based on the first packet. The second packet herein is obtained based on the first packet. For example, a source address of the second packet is obtained by translating a source address of the first packet, a destination address of the second packet is a destination address of the first packet, a packet payload of the second packet is a packet payload of the first packet, the second packet further includes a session identifier, and the session identifier is used by the second node to forward the second packet. For example, the second node implements session persistence or load balancing based on the session identifier.

Herein, the first node is a network node having a NAT or proxy function. The first node performs NAT or proxy on the source address of the first packet to generate the second packet. Because the NAT or proxy may translate a same source address into different addresses, or translate different source addresses into a same address, a session persistence and load balancing policy that is based on the source address of the second packet and that is of the second node is unavailable. In this application, the first node includes the session identifier in the generated second packet, so that the second node no longer needs to perform session persistence and load balancing based on the source address of the second packet, but can perform session persistence and load balancing based on the session identifier, and normal implementation of the session persistence and the load balancing is ensured.

Herein, the load balancing means allocating network traffic to different serving nodes based on load of the serving nodes, so that the load of the serving nodes is balanced, which is balancing that is based on computing power load. Certainly, the load balancing herein may alternatively be common load balancing. To be specific, load is shared among a plurality of serving nodes.

The session persistence means that a session is maintained after the session is established between a user and a serving node. To be specific, all packets that belong to the session and that are sent by the user are forwarded to the serving node.

In this application, the session identifier includes the following two implementations.

In a first manner, the session identifier includes the source address of the first packet. The first packet herein is to the foregoing packet on which address translation has not been performed.

In an embodiment, in addition to the source address of the first packet, the session identifier may further include the destination address of the first packet; further includes the destination address of the first packet and a source port of the first packet; or further includes the destination address of the first packet, a source port of the first packet, and a destination port of the first packet.

In a second manner, the session identifier includes a first application-aware identifier corresponding to the second packet.

For example, the first application-aware identifier is an application-aware identifier APP-aware ID that is based on application-aware networking APN or an application-aware identifier that is based on APN6.

In the foregoing implementation, the source address of the first packet or the first application-aware identifier is used as the session identifier, to ensure that session identifiers of same sessions are the same, and session identifiers of different sessions are different, and then ensure the normal implementation of the session persistence and the load balancing.

For example, the second packet is an internet protocol version 6 IPv6 packet, and the session identifier is in an extension header of the second packet; or
    the second packet is an internet protocol version 4 IPv4 packet, and the session identifier is in an option field of the second packet.

The extension header is a hop-by-hop options HBH header or a newly added extension header.

According to a second aspect, this application provides a packet forwarding method. The method is performed by a second node, and includes: The second node receives a first packet from a first node, where the first packet includes a first session identifier. The second node sends the first packet based on the first session identifier.

In this application, the packet received by the second node carries the first session identifier, so that the second node no longer needs to perform session persistence and load balancing based on a source address of the packet, but can perform session persistence and load balancing based on the first session identifier, and normal implementation of the session persistence and the load balancing is ensured.

The first packet herein is the second packet in the method provided in the first aspect.

For example, the first session identifier is used by the second node to perform load balancing.

For example, a source address of the first packet is obtained by translating a source address of a second packet, a destination address of the first packet is a destination address of the second packet, and a packet payload of the first packet is a packet payload of the second packet.

It should be noted that the second packet herein is the first packet in the method provided in the first aspect.

The first session identifier includes the following two implementations.

In a first manner, the first session identifier includes the source address of the second packet.

In an embodiment, in addition to the source address of the second packet, the first session identifier may further include the destination address of the second packet; further includes the destination address of the second packet and a source port of the second packet; or further includes the destination address of the second packet, a source port of the second packet, and a destination port of the second packet.

In a second manner, the first session identifier includes a first application-aware identifier corresponding to the second packet.

For example, the first application-aware identifier is an application-aware identifier that is based on application-aware networking APN or an application-aware identifier that is based on APN6.

In the foregoing implementation, the source address of the first packet or the first application-aware identifier is used as the first session identifier, to ensure that first session identifiers of same sessions are the same, and first session identifiers of different sessions are different, and then ensure the normal implementation of the session persistence and the load balancing.

For example, the first packet is an internet protocol version 6 IPv6 packet, and the first session identifier is in an extension header of the first packet; or the first packet is an internet protocol version 4 IPv4 packet, and the first session identifier is in an option field of the first packet.

The extension header is a hop-by-hop options HBH header or a newly added extension header.

In an embodiment, that the second node sends the first packet based on the first session identifier includes:

The second node generates a session table based on the first session identifier, where the session table includes a key value and next-hop information, and the key value includes the first session identifier; and the second node finds the next-hop information based on the key value corresponding to the first session identifier, and sends the first packet based on the next-hop information.

In this application, the second node is an ingress router in compute first networking or a load balancer node in load balancing networking.

When the second node is the ingress router in the compute first networking, that the second node generates a session table based on the first session identifier includes:

The second node obtains computing power information of a plurality of third nodes that each provide a first service and that are in the compute first networking, where the first service is a service corresponding to the first packet;

the second node determines a target node in the plurality of third nodes based on the computing power information of the plurality of third nodes, where the target node satisfies a computing power condition;

the second node determines the next-hop information based on the target node, where the next-hop information is for sending a packet to the target node; and the second node generates the session table based on the next-hop information and the first session identifier.

When the second node is the load balancer node in the load balancing networking, that the second node generates a session table based on the first session identifier includes:

The second node obtains load information of a plurality of third nodes that each provide a first service and that are in the load balancing networking, where the first service is a service corresponding to the first packet;

the second node determines a target node in the plurality of third nodes based on the load information of the plurality of third nodes, where the target node satisfies a load condition;

the second node determines the next-hop information based on the target node, where the next-hop information is for sending a packet to the target node; and the second node generates the session table based on the next-hop information and the first session identifier.

In an embodiment, the first packet sent by the second node includes the first session identifier.

In an embodiment, the method further includes:

The second node receives a third packet from the first node, where the third packet includes the first session identifier; and the second node sends, based on the first session identifier, the third packet to a destination node that is the same as that of the first packet.

In this implementation, the second node sends packets with a same session identifier to a same node, to implement a session persistence function.

In an embodiment, the method further includes:

The second node receives a fourth packet from the first node, where the fourth packet includes a second session identifier, and the second session identifier is different from the first session identifier; and the second node sends the fourth packet based on the second session identifier, so that the fourth packet and the first packet are sent to different serving nodes.

In this implementation, the second node sends packets with different session identifiers to different nodes, so that a load balancing function can be implemented.

According to a third aspect, this application provides a packet forwarding apparatus. The apparatus includes:

a receiving unit, configured to receive a first packet; and a sending unit, configured to send a second packet to a second node based on the first packet, where a source address of the second packet is obtained by translating a source address of the first packet, a destination address of the second packet is a destination address of the first packet, a packet payload of the second packet is a packet payload of the first packet, the second packet further includes a session identifier, and the session identifier is used by the second node to forward the second packet.

In an embodiment, the session identifier is used by the second node to perform load balancing.

In an embodiment, the session identifier includes the source address of the first packet; or the session identifier includes a first application-aware identifier corresponding to the second packet.

In an embodiment, when the session identifier includes the first application-aware identifier, the first packet further includes the first application-aware identifier.

In an embodiment, the second packet is an internet protocol version 6 IPv6 packet, and the session identifier is in an extension header of the second packet; or
the second packet is an internet protocol version 4 IPv4 packet, and the session identifier is in an option field of the second packet.

In an embodiment, the extension header is a hop-by-hop options HBH header or a newly added extension header.

According to a fourth aspect, this application provides a packet forwarding apparatus. The apparatus includes:
a receiving unit, configured to receive a first packet from a first node, where the first packet includes a first session identifier; and
a sending unit, configured to send the first packet based on the first session identifier.

In an embodiment, the first session identifier is used by the second node to perform load balancing.

In an embodiment, a source address of the first packet is obtained by translating a source address of a second packet, a destination address of the first packet is a destination address of the second packet, and a packet payload of the first packet is a packet payload of the second packet; and
the first session identifier includes the source address of the second packet; or
the first session identifier includes a first application-aware identifier corresponding to the first packet.

In an embodiment, when the first session identifier includes the source address of the second packet, the first session identifier further includes the destination address of the second packet;
the first session identifier further includes the destination address of the second packet and a source port of the second packet; or
the first session identifier further includes the destination address of the second packet, a source port of the second packet, and a destination port of the second packet.

In an embodiment, the first packet received by the second node is an IPv6 packet, and the first session identifier is in an extension header of the first packet; or
the first packet received by the first node is an IPv4 packet, and the first session identifier is in an option field of the first packet.

In an embodiment, the sending unit is configured to generate a session table based on the first session identifier, where the session table includes a key value and next-hop information, and the key value includes the first session identifier; and find the next-hop information based on the key value corresponding to the first session identifier, and send the first packet based on the next-hop information.

In an embodiment, the second node is an ingress router in compute first networking, and the sending unit is configured to: obtain, by the second node, computing power information of a plurality of third nodes that each provide a first service and that are in the compute first networking, where the first service is a service corresponding to the first packet; determine a target node in the plurality of third nodes based on the computing power information of the plurality of third nodes, where the target node satisfies a computing power condition; determine the next-hop information based on the target node, where the next-hop information is for sending a packet to the target node; and generate the session table based on the next-hop information and the first session identifier.

In an embodiment, the second node is a load balancer node in load balancing networking, and the sending unit is configured to: obtain load information of a plurality of third nodes that each provide a first service and that are in the load balancing networking, where the first service is a service corresponding to the first packet; determine a target node in the plurality of third nodes based on the load information of the plurality of third nodes, where the target node satisfies a load condition; determine the next-hop information based on the target node, where the next-hop information is for sending a packet to the target node; and generate the session table based on the next-hop information and the first session identifier.

In an embodiment, the first packet sent by the second node includes the first session identifier.

In an embodiment, the receiving unit is further configured to receive a third packet from the first node, where the third packet includes the first session identifier; and
the sending unit is further configured to send, based on the first session identifier, the third packet to a destination node that is the same as that of the first packet.

In an embodiment, the receiving unit is further configured to receive a fourth packet from the first node, where the fourth packet includes a second session identifier, and the second session identifier is different from the first session identifier; and
the sending unit is further configured to send the fourth packet based on the second session identifier, so that the fourth packet and the first packet are sent to different serving nodes.

According to a fifth aspect, this application provides a first node. The first node includes a processor and a memory. The memory is configured to store a software program and a module. The processor runs or executes the software program and/or the module that are/is stored in the memory, so that the first node implements the method according to any one of the embodiments of the first aspect.

According to a sixth aspect, this application provides a second node. The second node includes a processor and a memory. The memory is configured to store a software program and a module. The processor runs or executes the software program and/or the module that are/is stored in the memory, so that the second node implements the method according to any one of the embodiments of the second aspect.

In an embodiment, there are one or more processors and one or more memories.

In an embodiment, the memory and the processor may be integrated together, or the memory and the processor may be separately disposed.

In a specific implementation process, the memory may be a non-transitory memory such as a read-only memory (ROM). The memory and the processor may be integrated into a same chip, or may be separately disposed on different chips. A type of the memory and a manner in which the memory and the processor are disposed are not limited in this embodiment of this application.

According to a seventh aspect, this application provides a packet forwarding system. The system includes the first node according to the fifth aspect and the second node according to the sixth aspect.

According to an eighth aspect, this application provides a computer program (product). The computer program (product) includes computer program code. When the computer program code is run by a computer, the computer is enabled to perform the method according to any one of the embodiments of the first aspect or the second aspect.

According to a ninth aspect, this application provides a computer-readable storage medium. The computer-readable storage medium is configured to store program code executed by a processor. The program code is for implementing the method according to any one of the embodiments of the first aspect or the second aspect.

According to a tenth aspect, a chip is provided, and includes a processor. The processor is configured to invoke instructions from a memory, and run the instructions stored in the memory, so that a communication device on which the chip is installed performs the method according to any one of the embodiments of the first aspect or the second aspect.

According to an eleventh aspect, another chip is provided, and includes an input interface, an output interface, a processor, and a memory. The input interface, the output interface, the processor, and the memory are connected to each other through an internal connection path. The processor is configured to execute code in the memory. When the code is executed, the processor is configured to perform the method according to any one of the embodiments of the first aspect or the second aspect.

DESCRIPTION OF EMBODIMENTS

To make objectives, technical solutions, and advantages of this application clearer, the following further describes the implementations of this application in detail with reference to the accompanying drawings.

To facilitate understanding of the technical solutions provided in embodiments of this application, compute first networking (CFN) is first described. In the CFN, a network is for participating in computing scheduling, and a same application request may be served by a plurality of equivalent nodes. In the CFN, an appropriate (optimal) serving node needs to be found for each new application request in real time. A dynamic multicast technology is used for the CFN, and serving nodes that can provide a same service use a same anycast address.

In the CFN, serving node selection is performed based on computing power of the serving nodes. The computing power is defined as follows.

Static computing power: central processing unit (CPU)/graphics processing unit (GPU) performance, a storage capacity, network interface bandwidth, and the like.

Dynamic computing power: CPU/GPU/memory usage, a quantity of current connections, and the like.

Figure 1:
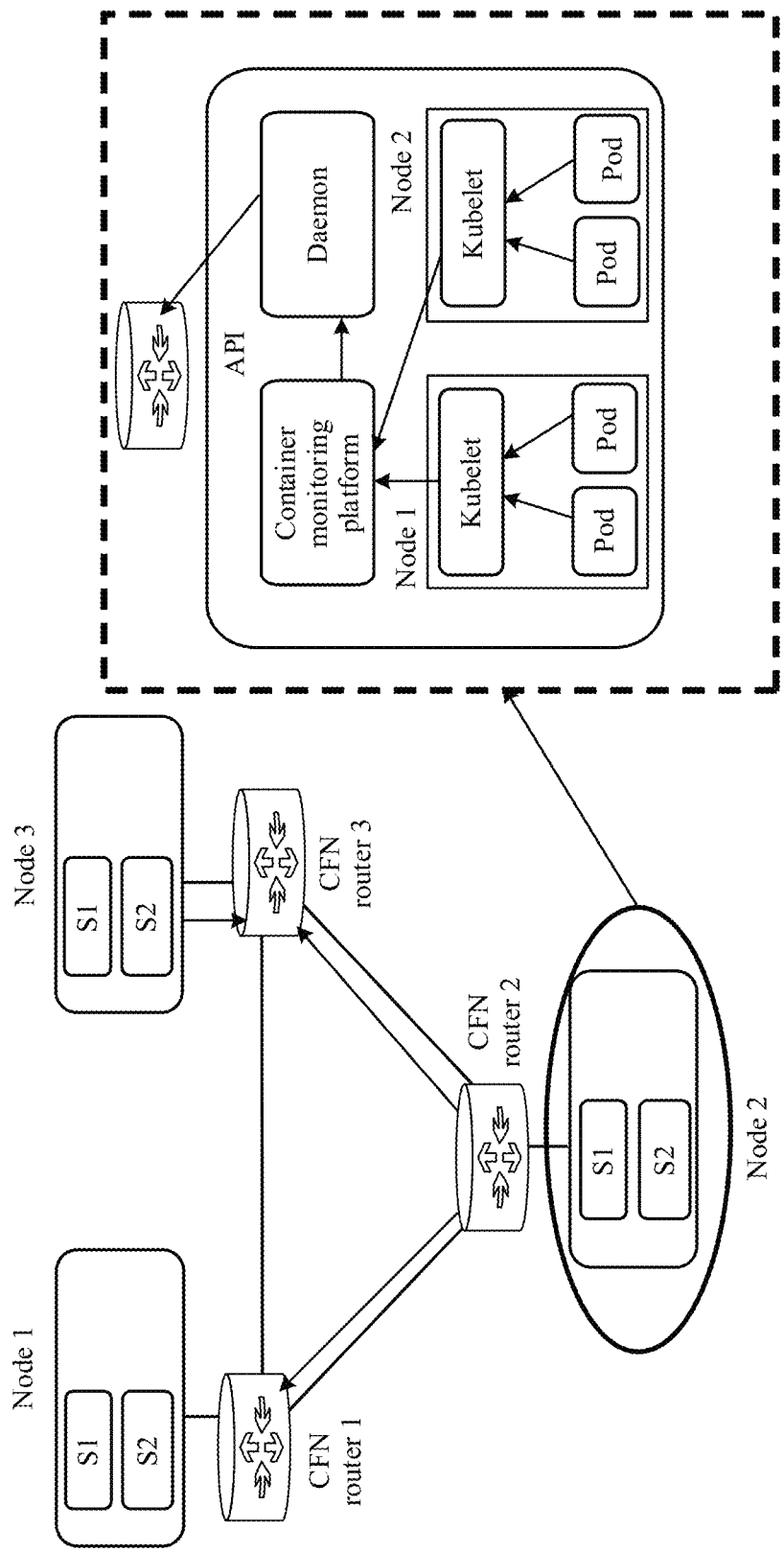
FIG. 1 is a schematic diagram of a CFN network architecture according to an embodiment of this disclosure.

FIG. 1 is a schematic diagram of a CFN network architecture according to an embodiment of this disclosure. FIG. 1 shows three MEC sites (Node 1 to Node 3, namely, the foregoing serving nodes), and two application (APP) instances, namely, S1 and S2, are deployed in each MEC site. In a related technology, a manner in which CFN implements computing power awareness and computing power information diffusion is as follows.

1. The MEC Site Collects Computing Power.

A deamon of the MEC site collects the computing power based on an APP granularity. Because Node 1 and Node 2 illustrated in FIG. 1 are both container environments, a same deamon is used for collection. If different nodes are heterogeneous environments, different deamons are needed for collection. Computing power information is sent to a local CFN router through the border gateway protocol (BGP).

2. A Manner in which the CFN Router is Aware of the Computing Power Information of the MEC Site The CFN router is aware of the computing power information of an APP of the local MEC site through the BGP protocol.

3. Computing Power Information Diffusion and Synchronization Between CFN Routers The computing power information of the APP is diffused and synchronized between the CFN routers along with BGP VPN routes.

Figure 2:
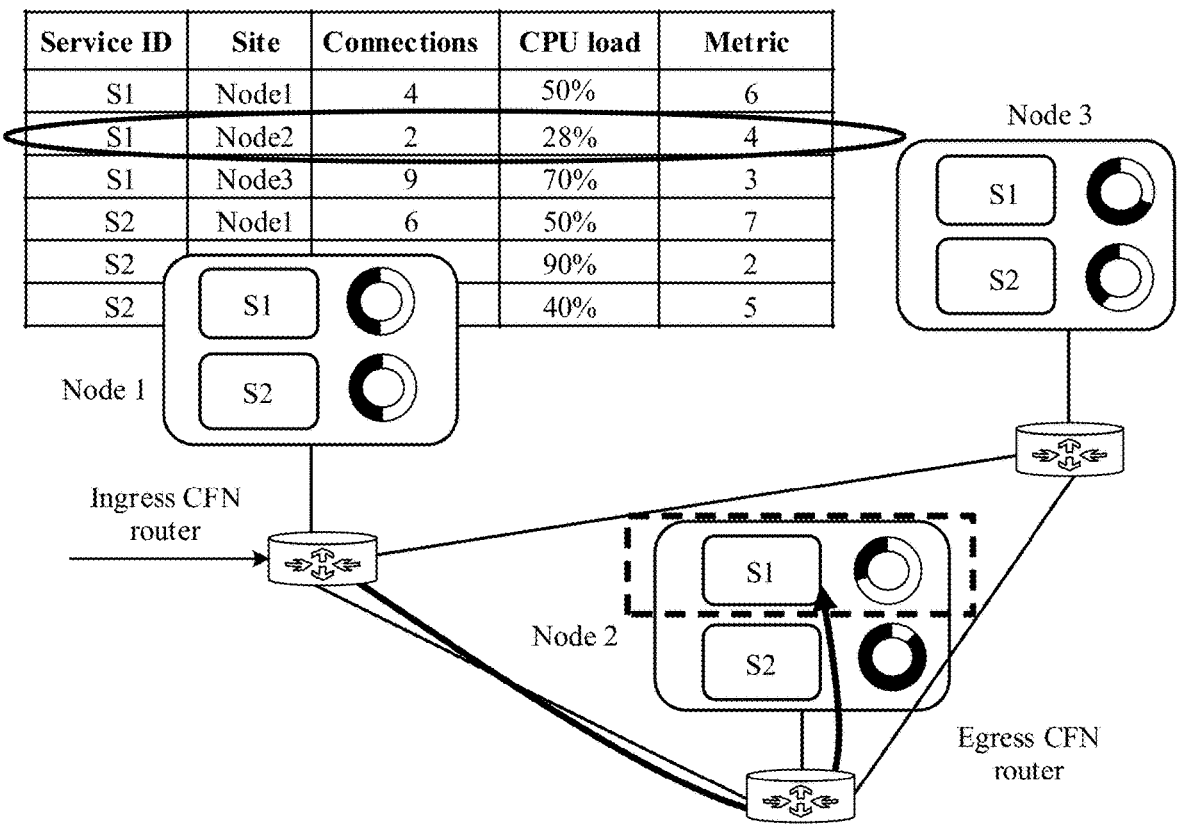
FIG. 2 is a schematic diagram of a CFN network architecture according to an embodiment of this disclosure.

FIG. 2 is a schematic diagram of a CFN network architecture according to an embodiment of this disclosure. Refer to FIG. 2. CFN mainly includes an ingress router and an egress router. The CFN can implement a load balancing proxy to divert an application request to an appropriate APP instance. A process is as follows.

1. Each app calculates a computing power convergence metric for each site based on computing power information released by the site. In a load balancing algorithm, an APP instance selection is performed with reference to the metric. Generally, an APP instance corresponding to a smallest metric is selected.

2. The ingress CFN router selects an S1 instance of Node 2 for service by using the load balancing algorithm for the first data packet of a flow for a user to access S1. As shown in FIG. 2, load of the S1 instance of Node 2 in three serving nodes is the smallest, and a corresponding metric is the smallest.

3. The ingress CFN router sends the first data packet to the egress CFN router connected to Node 2 and generates a session table for the flow.

4. Subsequent data packets of the flow are sent to a same instance, namely, an instance of an APP 1 of Node 2, to maintain a session connection.

In the foregoing process, the CFN router, as a load balancer, schedules a computing task to an appropriate serving node to ensure service experience; through flow session persistence (or Session Affinity), it is ensured that a service is not interrupted; serving node and path selection is performed based on computing power and a network status, and a network factor is considered during serving node selection; and load balancing and session persistence of the CFN router are based on a layer 3 (a network layer) and a layer 4 (a transport layer).

Figure 3:
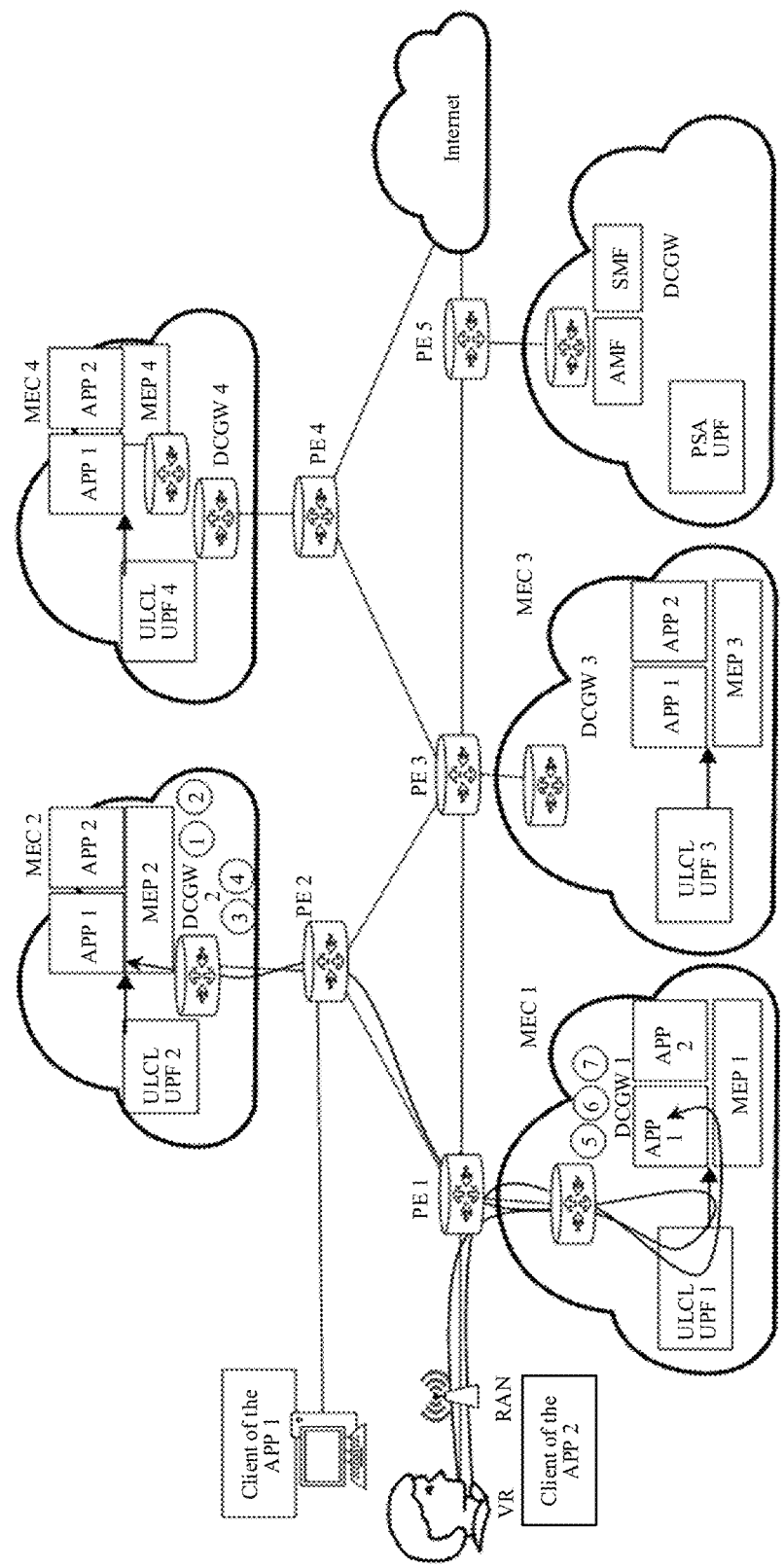
FIG. 3 is a schematic diagram of a 5G MEC network architecture according to an embodiment of this disclosure.

That CFN is applied to 5G mobile edge computing (MEC) solution is a typical application scenario of the CFN. FIG. 3 is a schematic diagram of a 5G MEC network architecture according to an embodiment of this disclosure. Refer to FIG. 3. Same APPs are deployed at a plurality of MEC sites (MEC 1 to MEC 4). A data center gateway (DCGW) at the MEC site serves as a CFN router.

A packet for a user to access an APP is offloaded to a local network through an uplink classifier (ULCL) user plane function (UPF). In the local network, an ingress CFN router selects an APP instance of an appropriate MEC site for service. In FIG. 3, a PE is a provider edge router, an MEP is a mobile edge platform (ME platform), and a PSA is a protocol data unit session anchor (PDU session anchor).

However, to arrive at the local network, the ULCL UPF usually performs a network address translation (NAT) operation to translate a source address of the packet into a small quantity of addresses through NAT. As a result, a conventional solution of load balancing and session persistence that are based on a layer 3 will be invalid.

The following describes in detail, with reference to application scenarios of this application, that load balancing and session persistence are invalid due to a translation operation such as NAT.

Figure 4:
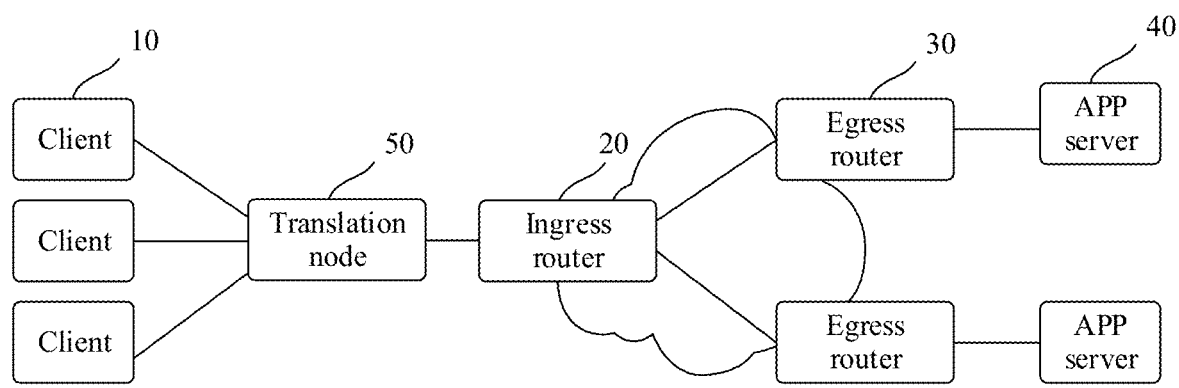
FIG. 4 is a schematic diagram of an application scenario according to an embodiment of this application.

FIG. 4 is a schematic diagram of an application scenario according to an embodiment of this application. Refer to FIG. 4. This scenario is a mobile edge computing (MEC) scenario, and involves compute first networking (compute first networking, CFN) and application-aware networking (APN).

The CFN is used as an example. In the CFN, a network is for being aware of computing power information of a serving node in real time, and the serving node is flexibly selected based on the computing power information, to implement optimal utilization of a resource in the entire network. The application scenario includes a first node and a second node.

The first node is a translation node 50 in the figure, and the translation node 50 may be any device having a network address translation (NAT) function or an application proxy server. The second node is an ingress router 20 in the figure.

In the CFN, the ingress router 20 is close to clients (APP clients, users) 10 such as cell site gateway (CSG) devices; egress routers 30 are close to application (APP) servers 40, for example, data center gateway (DCGW) devices, on which applications are deployed; and in a special case, a same router may have functions of both an ingress router and an egress router. The application APP is deployed on each APP server 40. Each APP corresponds to an anycast address. For example, an APP 1 corresponds to anycast 1, and an APP 2 corresponds to anycast 2.

The clients 10 initiate application requests. The ingress router 20 supports a CFN dynamic anycast function. The ingress router 20 is an ingress device for packets sent by the client 10 to enter the CFN, and is a traffic scheduling node. The node has network-level load balancing and session persistence functions. The egress routers 30 support the CFN dynamic anycast function, and are egress devices for the packets sent by the client 10 to exit the CFN. The APP servers 40 are servers or a cluster for running application services, and respond to the application requests of the clients 10.

Figure 5:
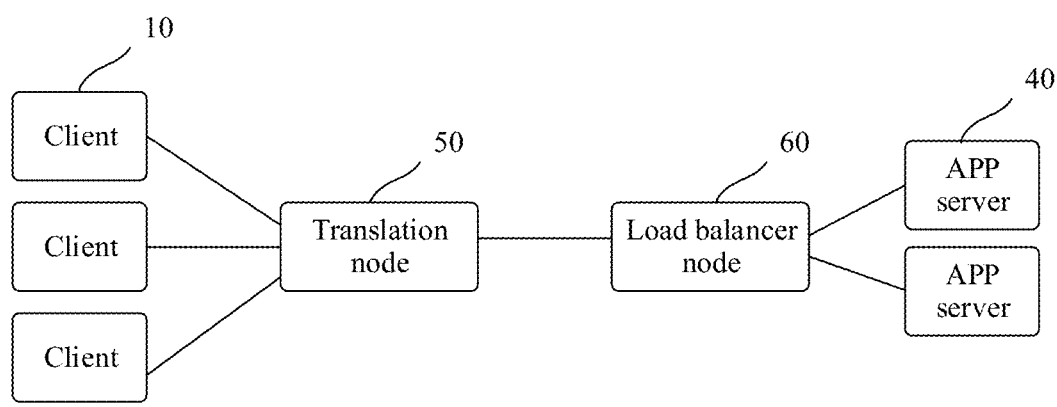
FIG. 5 is a schematic diagram of another application scenario according to an embodiment of this application.

FIG. 5 is a schematic diagram of another application scenario according to an embodiment of this application. Refer to FIG. 5. This scenario is a load balancing scenario, and involves APN and CFN.

The APN is used as an example. A network is aware of an identifier of an APP of a packet, and performs application-level refined scheduling and application-level processing. The application scenario includes a first node and a second node.

The first node is a translation node 50 in the figure. The second node is a load balancer node 20 in the figure. The load balancer node 20 may be any device having a load balancing function, for example, a router.

The load balancer node 20 is responsible for dispersing application requests to available serving nodes in a server cluster.

It should be noted that, in the scenario shown in FIG. 4, the ingress router 20 may also perform the load balancing function.

In a related technology, in the application scenarios shown in FIG. 4 and FIG. 5, after the packets generated by the clients arrive at the first node, the first node performs, to save an internet protocol (IP) address, network address translation (NAT) or proxy on source addresses of the packets sent by the clients. In this way, a possible result is that two connections belonging to a same session have different source addresses after translation. Consequently, a session persistence solution based on a source address is unavailable. Alternatively, a possible result is that two connections belonging to different sessions have a same address after translation. Consequently, tasks corresponding to the different sessions are allocated to a same serving node, and load imbalance is caused.

In another implementation, the server may alternatively be another device such as a virtual machine (VM).

Figure 6:
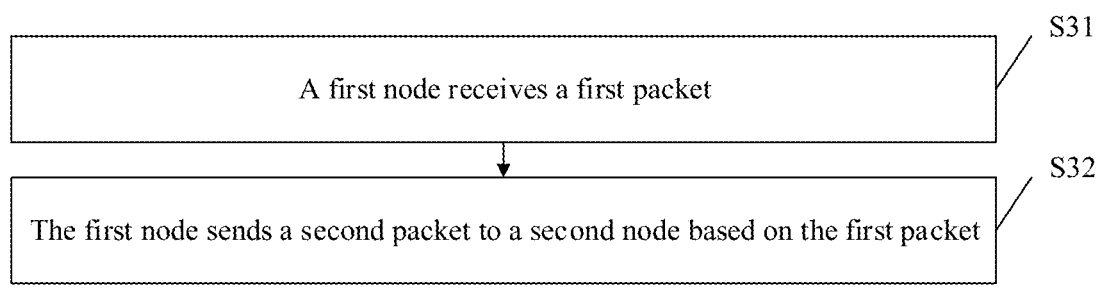
FIG. 6 is a flowchart of a packet forwarding method according to an embodiment of this application.

FIG. 6 is a flowchart of a packet forwarding method according to an embodiment of this application. The method may be performed by a first node in an application scenario. As shown in FIG. 6, the method includes the following operations.

S31: The first node receives a first packet.

S32: The first node sends a second packet to a second node based on the first packet.

A source address of the second packet is obtained by translating a source address of the first packet, a destination address of the second packet is a destination address of the first packet, a packet payload of the second packet is a packet payload of the first packet, the second packet further includes a session identifier, and the session identifier is used by the second node to forward the second packet.

Herein, the first node is a network node having a NAT or proxy function. The first node performs NAT or proxy on the source address of the first packet to generate the second packet. Because the NAT or proxy may translate a same source address into different addresses, or translate different source addresses into a same address, a session persistence and load balancing policy that is based on the source address of the second packet and that is of the second node is unavailable. In this application, the first node includes the session identifier in the generated second packet, so that the second node no longer needs to perform session persistence and load balancing based on the source address of the second packet, but can perform session persistence and load balancing based on the session identifier, and normal implementation of the session persistence and the load balancing is ensured. In addition, in this solution, the session persistence and the load balancing are implemented based on the session identifier carried in a header, and deep parsing is not needed.

Figure 7:
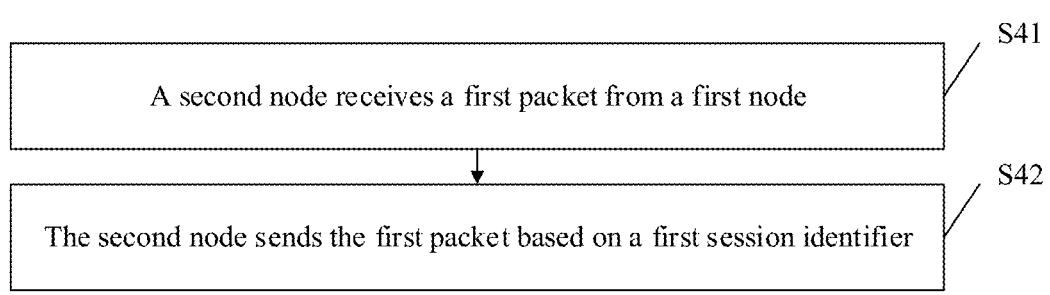
FIG. 7 is a flowchart of a packet forwarding method according to an embodiment of this application.

FIG. 7 is a flowchart of a packet forwarding method according to an embodiment of this application. The method may be performed by a second node in an application scenario. As shown in FIG. 7, the method includes the following operations.

S41: The second node receives a first packet from a first node, where the first packet includes a first session identifier.

S42: The second node sends the first packet based on the first session identifier.

In this application, the packet received by the second node carries the first session identifier, so that the second node no longer needs to perform session persistence and load balancing based on a source address of the packet, but can perform session persistence and load balancing based on the first session identifier, and normal implementation of the session persistence and the load balancing is ensured.

Figure 8:
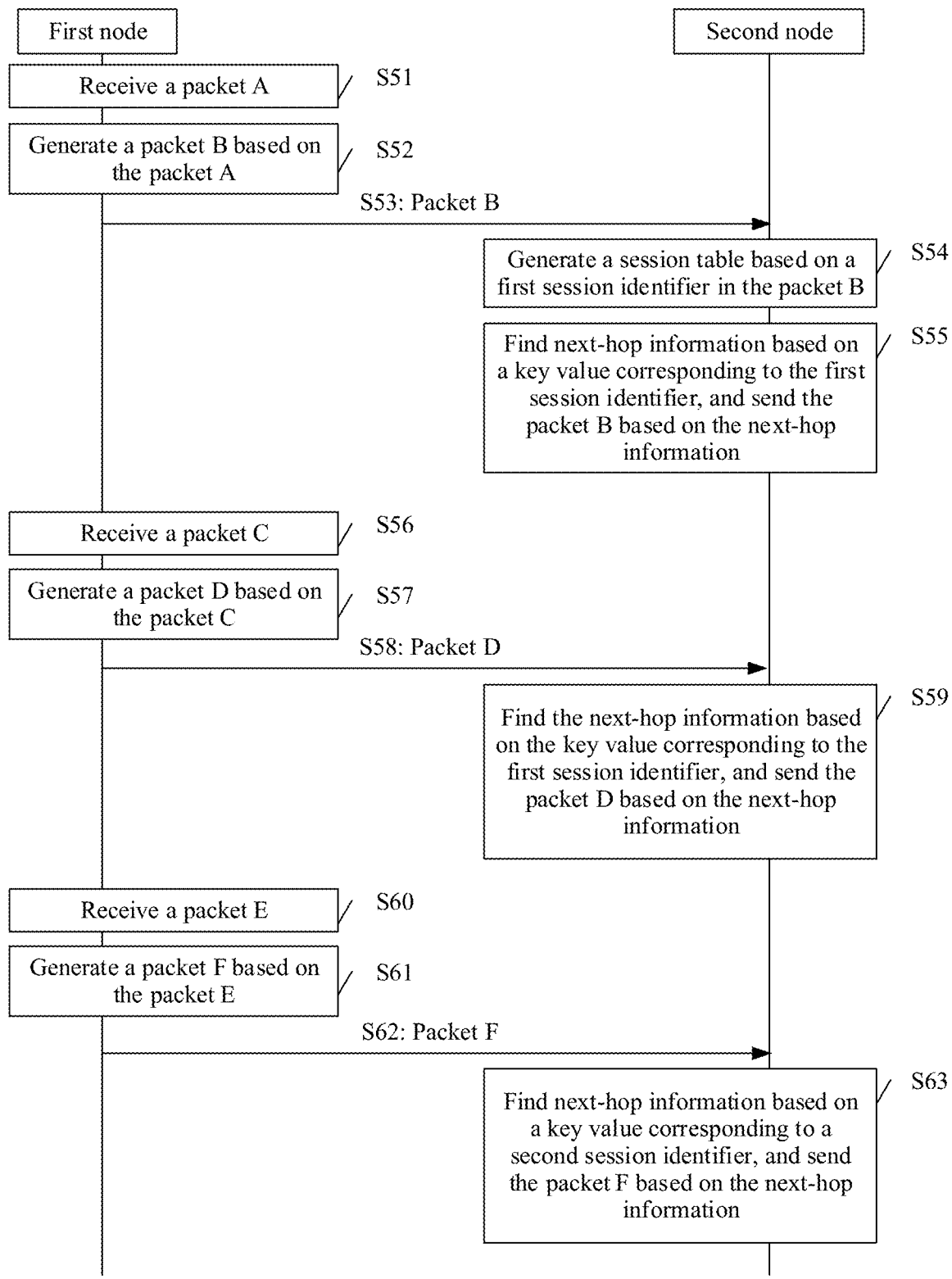
FIG. 8 is a flowchart of a packet forwarding method according to an embodiment of this application.

FIG. 8 is a flowchart of a packet forwarding method according to an embodiment of this application. The method may be performed by a first node and a second node in an application scenario. As shown in FIG. 8, the method includes the following operations.

S51: The first node receives a packet A.

The packet received by the first node is sent by a client. The first node may be directly connected to the client, thereby directly receiving the packet A. Alternatively, the first node may be connected to the client by using another node, thereby receiving the packet A through forwarding of the another node.

Figure 9:
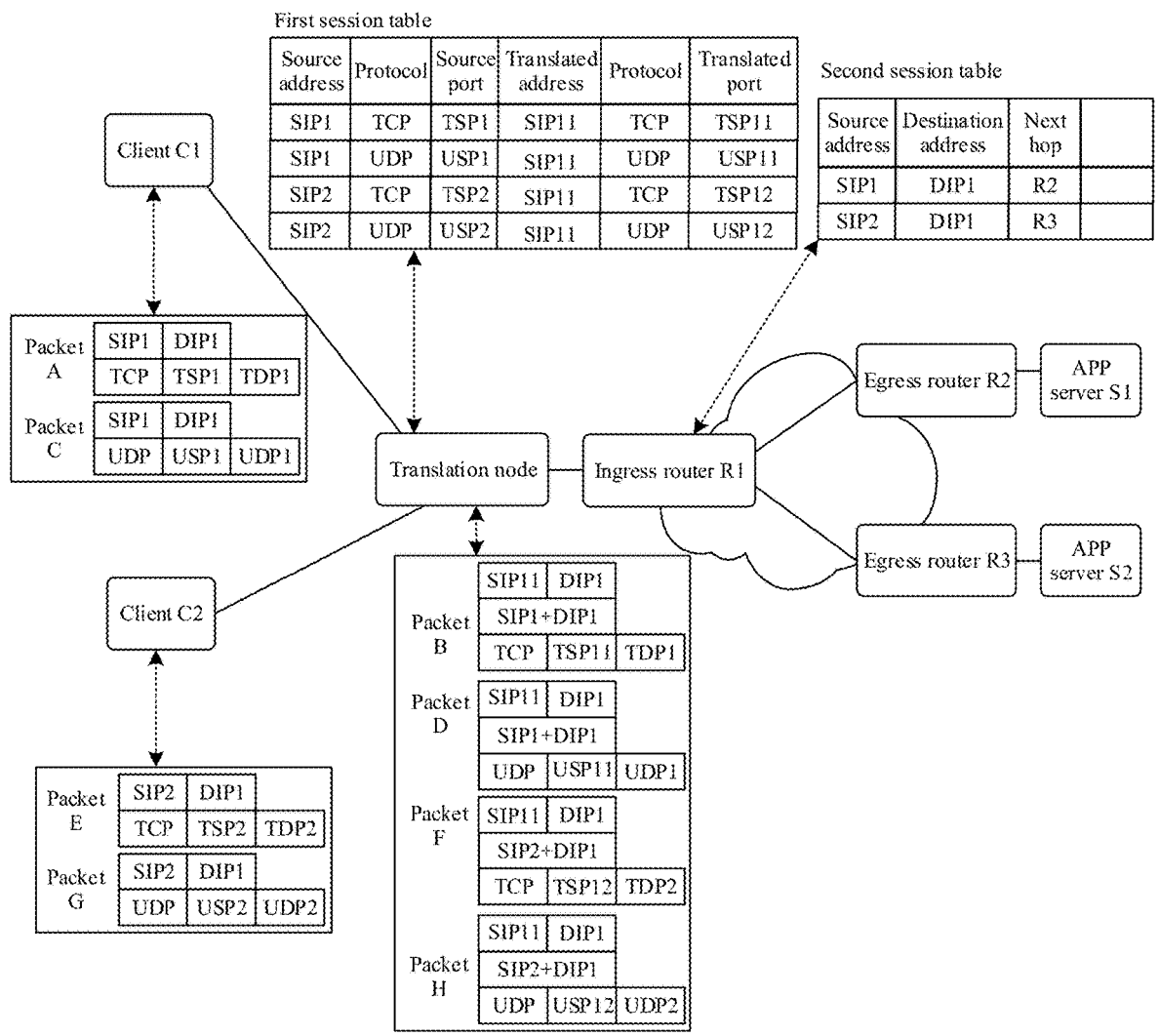
FIG. 9 is a schematic flowchart of packet forwarding according to an embodiment of this application.

FIG. 9 is a schematic flowchart of packet forwarding according to an embodiment of this application. Refer to FIG. 9, a first node (a conversion node) receives a packet A sent by a client C1. The packet A includes a source address (SIP1), a destination address (DIP1), a protocol type (TCP), a source port (TSP1), and a destination port (TDP1), where the source address (SIP1) and the destination address (DIP1) are in a network-side IP header of the packet, and the protocol type (TCP), the source port (TSP1), and the destination port (TDP1) are in a transport layer of the packet.

The destination address may be an anycast address corresponding to an APP.

S52: The first node generates a packet B based on the packet A.

The first node performs translation (NAT translation or proxy) on the source address and the source port of the packet A, and adds a session identifier to the packet B.

In this embodiment of this application, a source address of the packet B is obtained by translating the source address of the packet A, a destination address of the packet B is the destination address of the packet A, a packet payload of the packet B is a packet payload of the packet A, the packet B further includes a first session identifier, and the first session identifier is used by a second node to forward the packet B.

A source port of the packet B is obtained by translating the source port of the packet A, and a destination port of the packet B is the destination port of the packet A.

As shown in FIG. 9, the packet B includes the source address (SIP11) obtained through translation, the destination address (DIP1), the first session identifier (SIP1+DIP1), the protocol type (TCP), the source port (TSP11) obtained through translation, and the destination port (TDP1).

Compared with the packet A, the packet B has the different source address and source port that are obtained through translation, and may also have different content of a layer 3 (L3) and a layer 4 (L4).

In this application, the session identifier includes the following two implementations.

In a first manner, the session identifier includes the source address of the packet A.

In an embodiment, in addition to the source address of the packet A, the session identifier may further include the destination address of the packet A; further includes the destination address of the packet A and the source port of the packet A; or further includes the destination address of the packet A, the source port of the packet A, and the destination port of the packet A.

As shown in FIG. 9, the first session identifier carried in the packet B includes the source address (SIP1) and the destination address (DIP1).

In a second manner, the session identifier includes a first application-aware identifier corresponding to the packet A (the packet B).

For example, the first application-aware identifier is an application-aware identifier (APP-aware ID) that is based on APN or an application-aware identifier that is based on APN6 (application-aware IPv6 networking). The application awareness identifier that is based on the APN or the APN6 is referred to as APNID for short below.

The APP-aware ID application-aware identifier usually includes an application identifier (APP ID), a user identifier (User ID), a flow identifier (Flow ID), and the like. In the solution provided in this application, the APP-aware ID carried in the packet may only need to include the APP ID and the user ID, and is for distinguishing users.

Figure 10:
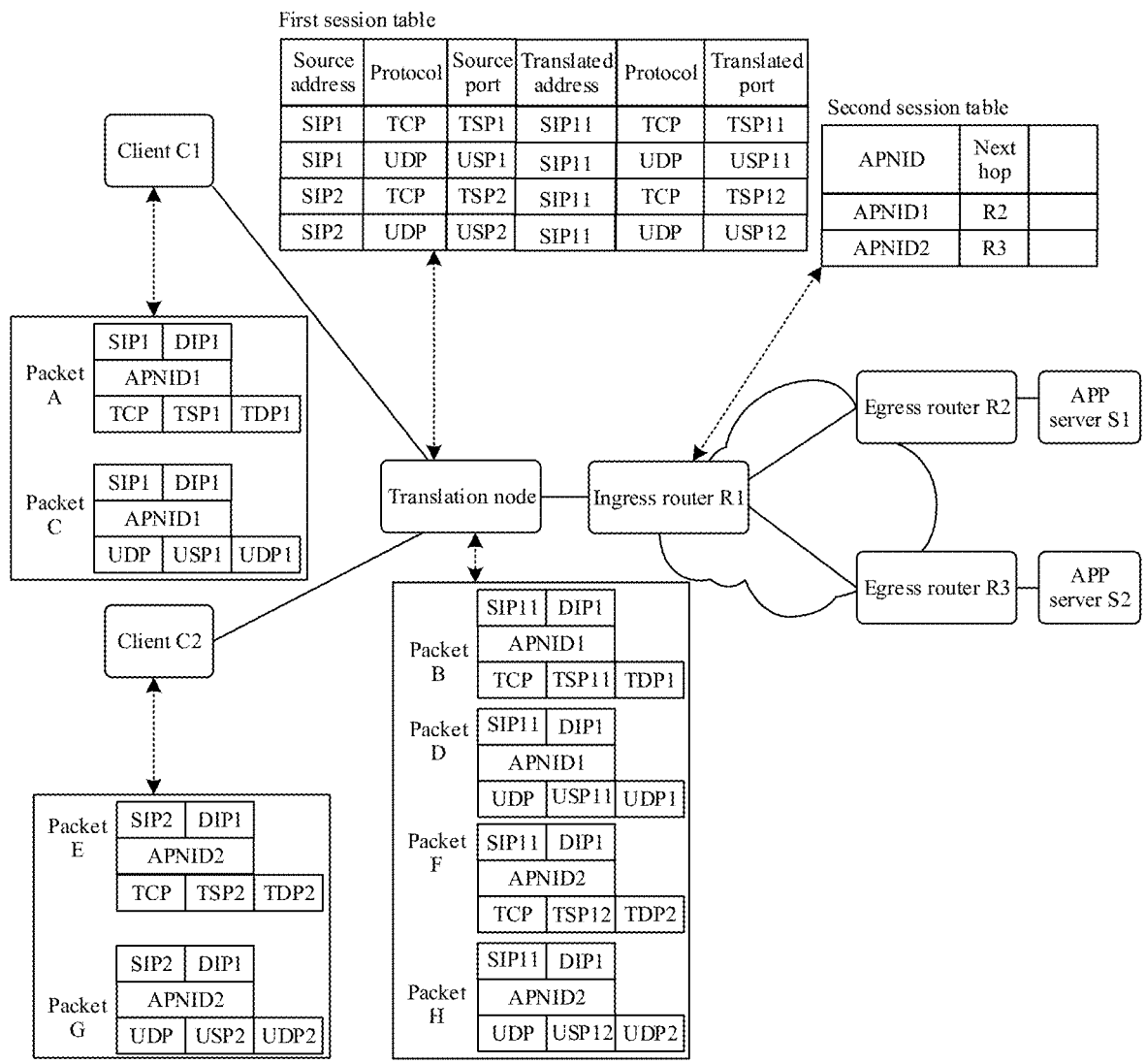
FIG. 10 is a schematic flowchart of packet forwarding according to an embodiment of this application.

FIG. 10 is another schematic flowchart of packet forwarding according to an embodiment of this application. Refer to FIG. 10. In this implementation, a first session identifier carried in a packet B is an application-aware identifier (APNID1).

In the implementation shown in FIG. 10, a packet A may carry the application-aware identifier (APNID1).

In another implementation, a packet A may alternatively not carry the application-aware identifier (APNID1), and the application-aware identifier (APNID1) may be set by a translation node having an offloading function.

In the foregoing implementation, a source address of the packet A or a first application-aware identifier is used as the first session identifier, to ensure that session identifiers of same sessions are the same, and session identifiers of different sessions are different, and then ensure normal implementation of session persistence and load balancing.

For example, the packet B is an internet protocol version 6 IPv6 packet, and the first session identifier is in an extension header of the packet B; or
 the packet B is an internet protocol version 4 IPv4 packet, and the first session identifier is in an option field of the packet B. The option field is in a network layer header of the packet.

The extension header is a hop-by-hop options (HBH) header or a newly added extension header.

Therefore, the solution provided in this application is a session persistence solution that is based on a network side and a transport layer rather than a session persistence solution that is based on a higher layer (for example, an application layer), and deep parsing is not needed.

It should be noted that the packet A herein is the first packet in the method procedure corresponding to FIG. 6, the packet B is the second packet in the method procedure corresponding to FIG. 6, and the packet B is also the first packet in the method procedure corresponding to FIG. 7.

In embodiments of this application, in addition to translating the source address and the source port to generate the new packet (the packet B), the first node further needs to generate a first session table based on the packet A. As shown in FIG. 9 and FIG. 10, the first session table includes a source address, a protocol (a protocol type before the translation), a source port, a translated address (namely, a source address obtained through translation), a protocol (a protocol type after the translation), and a translated port (a source port obtained through translation). The first node performs session persistence based on the first session table.

S53: The first node sends the packet B to the second node. The second node receives the packet B.

The second node may be directly connected to the first node, thereby directly receiving the packet B. Alternatively, the second node may be connected to the first node by using another node, thereby receiving the packet B through forwarding of the another node.

S54: The second node generates a session table based on the first session identifier in the packet B, where the session table includes a key value and next-hop information, and the key value includes the first session identifier.

In this application, the second node is an ingress router in compute first networking or a load balancer node in load balancing networking.

When the second node is the ingress router in the compute first networking, that the second node generates a session table based on the first session identifier includes:

The second node obtains computing power information of a plurality of third nodes that each provide a first service and that are in the compute first networking, where the first service is a service corresponding to the packet B;

the second node determines a target node in the plurality of third nodes based on the computing power information of the plurality of third nodes, where the target node satisfies a computing power condition;

the second node determines the next-hop information based on the target node, where the next-hop information is for sending a packet to the target node; and the second node generates the session table based on the next-hop information and the first session identifier.

With reference to FIG. 9 and FIG. 10, the following describes a manner of generating the session table by the ingress router in the compute first networking.

As shown in FIG. 9 and FIG. 8, the third nodes include an APP server S1 and an APP server S2. It is assumed that the APP server S1 and the APP server S2 each can provide the first service (corresponding to APNID1) and a second service (corresponding to APNID2).

The second node (R1) receives the packet B, and determines, based on the packet B, that nodes that can provide the service corresponding to the packet B include S1 and S2. The second node determines, based on computing power information of S1 and S2, that a node whose computing power satisfies the condition is S1. The second node determines that a next hop to S1 is R2. The second node generates a second session table based on the next hop R2 and the first session identifier.

In an example shown in FIG. 9, the first session identifier includes the source address (SIP1) and the destination address (DIP1), and the second session table includes the source address (SIP1), the destination address (DIP1), and the next hop (R2), where the source address (SIP1) and the destination address (DIP1) constitute the session identifier.

In an example shown in FIG. 10, the first session identifier is the application-aware identifier (APNID1), and the second session table includes the application-aware identifier (APNID1) and the next hop (R2).

When the second node is the load balancer node in the load balancing networking, that the second node generates a session table based on the first session identifier includes:

The second node obtains load information of a plurality of third nodes that each provide a first service and that are in the load balancing networking, where the first service is a service corresponding to the packet B;

the second node determines a target node in the plurality of third nodes based on the load information of the plurality of third nodes, where the target node satisfies a load condition;

the second node determines the next-hop information based on the target node, where the next-hop information is for sending a packet to the target node; and the second node generates the session table based on the next-hop information and the first session identifier.

Figure 11:
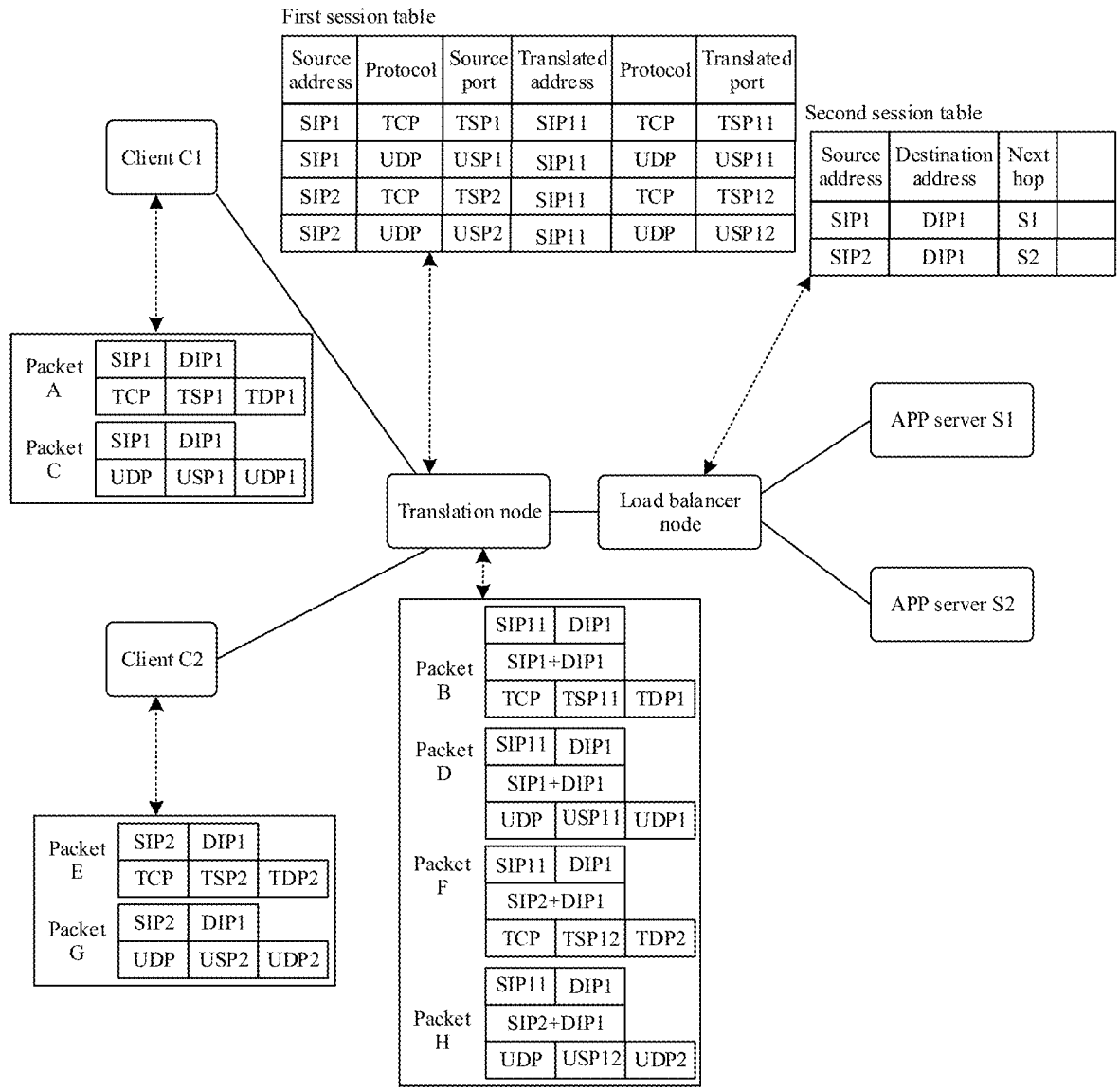
FIG. 11 is a schematic flowchart of packet forwarding according to an embodiment of this application.
Figure 12:
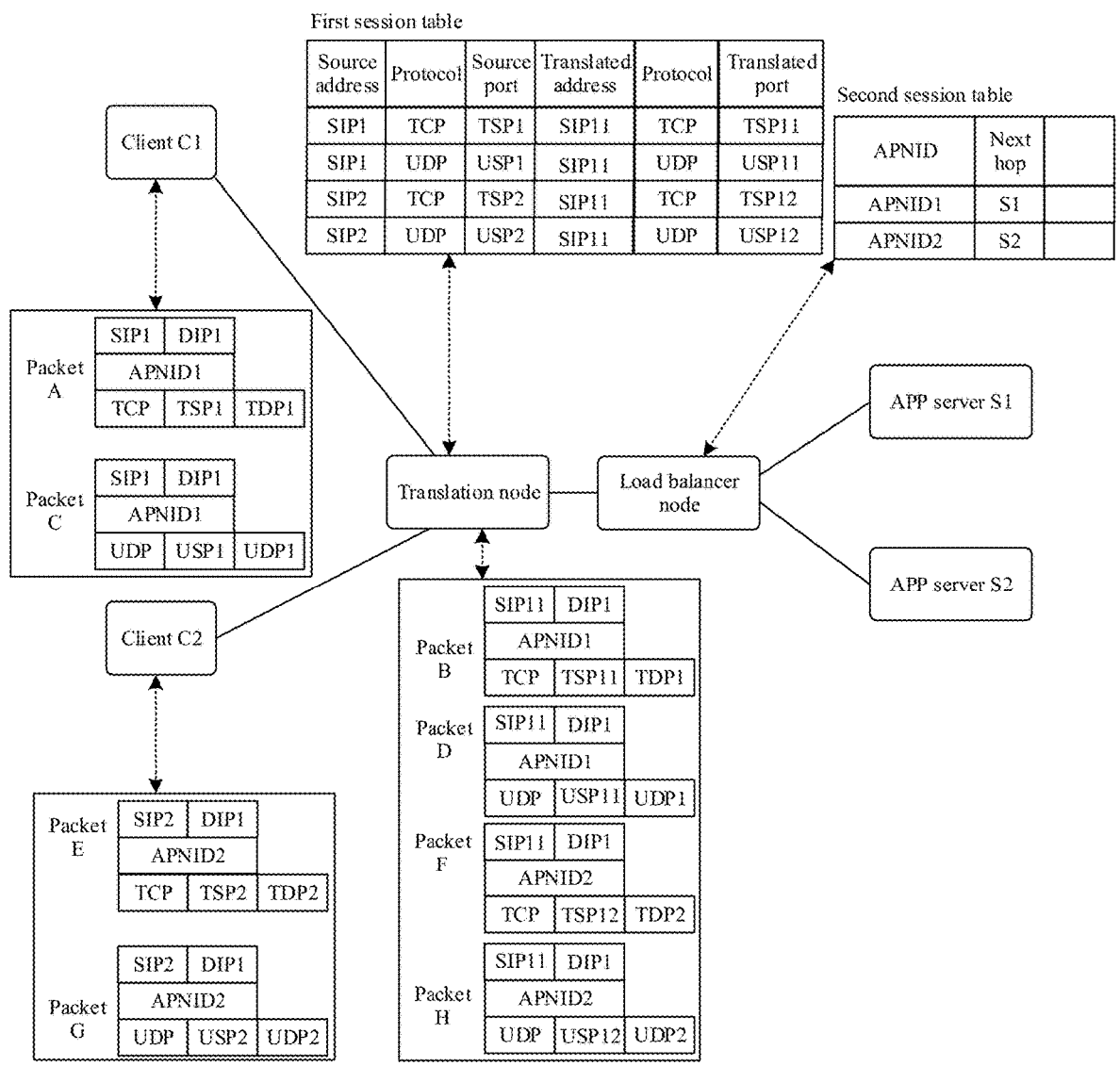
FIG. 12 is a schematic flowchart of packet forwarding according to an embodiment of this application.

With reference to FIG. 11 and FIG. 12, the following describes a manner of generating the session table by the load balancer node in the load balancing networking.

As shown in FIG. 11 and FIG. 10, the third nodes include an APP server S1 and an APP server S2. It is assumed that the APP server S1 and the APP server S2 each can provide the first service (APNID1) and a second service (APNID2).

The second node (R1) receives the packet B, and determines, based on the packet B, that nodes that can provide the service corresponding to the packet B include S1 and S2. The second node determines, based on load information of S1 and S2, that a node whose load satisfies the condition is S1. The second node determines that a next hop to S1 is S1 (which is merely an example, and there is usually an intermediate node between the second node and S1 actually). The second node generates a second session table based on the next hop S1 and the first session identifier.

In an example shown in FIG. 11, the first session identifier includes the source address (SIP1) and the destination address (DIP1), and the second session table includes the source address (SIP1), the destination address (DIP1), and the next hop (S1).

In an example shown in FIG. 12, the first session identifier is the application-aware identifier (APNID1), and the second session table includes the application-aware identifier (APNID1) and the next hop (S1).

In this application, that a server provides the first service means processing a packet request corresponding to the first service, for example, processing, by using an APP server corresponding to the first service, the packet request corresponding to the first service.

S55: The second node finds the next-hop information based on the key value corresponding to the first session identifier, and sends the packet B based on the next-hop information.

For example, in FIG. 9, the second node (R1) performs a query by using a key (SIP1+DIP1), to obtain a next hop R1, and then sends the packet B by using R1.

In an implementation of this application, when sending the packet B, the second node may reserve the first session identifier in the packet B. For example, in the scenario shown in FIG. 9, the first session identifier in the packet B is reserved. In this way, an egress router R2 may continue to perform session persistence and load balancing based on the first session identifier. That is, the egress router R2 can perform secondary load balancing and session persistence. A specific manner in which the egress router R2 performs session persistence and load balancing based on the first session identifier is basically the same as that described in the foregoing embodiment. Details are not described herein again.

In another implementation of this application, when sending the packet B, the second node deletes the first session identifier in the packet B.

S56: The first node receives a packet C.

In this embodiment of this application, the packet A and the packet C correspond to a plurality of flows to a same application server, and the plurality of flows belong to a same session.

S57: The first node generates a packet D based on the packet C.

A manner in which the first node generates the packet D is the same as a manner of generating the packet B.

FIG. 9 is used as an example. The packet C includes the source address (SIP1), the destination address (DIP1), a protocol type (UDP), a source port (USP1), and a destination port (UDP1).

The packet D includes the source address (SIP11) obtained through translation, the destination address (DIP1), the first session identifier (SIP1+DIP1), the protocol type (UDP), a source port (USP11) obtained through translation, and the destination port (UDP1).

S58: The first node sends the packet D to the second node. The second node receives the packet D.

S59: The second node finds the next-hop information based on the key value corresponding to the first session identifier, and sends the packet D based on the next-hop information.

Herein, an entry in the session table generated in operation S54 is queried.

The second node sends, based on the first session identifier, the packet D to a destination node that is the same as that of the packet B.

For example, in FIG. 9, both packet B and packet D are sent to the APP server S1.

S60: The first node receives a packet E.

S61: The first node generates a packet F based on the packet E.

A manner in which the first node generates the packet F is the same as the manner of generating the packet B.

FIG. 9 is used as an example. The packet E includes a source address (SIP2), the destination address (DIP1), the protocol type (TCP), a source port (TSP2), and the destination port (TDP1).

The packet F includes the source address (SIP11) obtained through translation, the destination address (DIP1), a second session identifier (SIP2+DIP1), the protocol type (TCP), a source port (TSP12) obtained through translation, and a destination port (TDP2).

As shown in FIG. 9, the source addresses of the packet A, the packet C, and the packet E are translated into the same source address. Subsequent session persistence cannot be implemented by using the source addresses of the packet B, the packet D, and the packet F, and session identifiers are needed. For example, the packet B and the packet D have the same session identifier, and belong to a same session; and the packet B and the packet F have the different session identifiers, and belong to different sessions.

S62: The first node sends the packet F to the second node. The second node receives the packet F.

S63: The second node finds next-hop information based on a key value corresponding to the second session identifier, and sends the packet F based on the next-hop information.

Herein, the entry in the session table generated in operation S54 is not queried, but another entry generated based on the second session identifier is queried. A generation manner is the same as that in operation S54.

The second node sends the packet F based on the second session identifier, so that the packet F and the packet B are sent to different serving nodes.

For example, in FIG. 9, the packet B is sent to the APP server S1, and the packet F is sent to the APP server S2.

Figure 13:
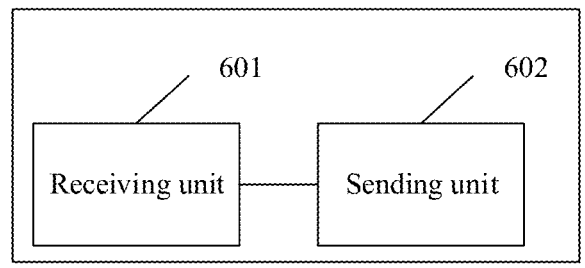
FIG. 13 is a block diagram of a packet forwarding apparatus according to an embodiment of this application.

FIG. 13 is a block diagram of a packet forwarding apparatus according to an embodiment of this application. The packet forwarding apparatus may be implemented as all or a part of a first node by using software, hardware, or a combination thereof. The first node is the first node in the application scenario shown in FIG. 4 or FIG. 5. The packet forwarding apparatus may include a receiving unit 601 and a sending unit 602.

The receiving unit 601 is configured to perform operation S31 in FIG. 6. To be specific, the receiving unit 601 is configured to receive a first packet.

The sending unit 602 is configured to perform operation S32 in FIG. 6. To be specific, the sending unit 602 is configured to send a second packet to a second node based on the first packet, where a source address of the second packet is obtained by translating a source address of the first packet, a destination address of the second packet is a destination address of the first packet, a packet payload of the second packet is a packet payload of the first packet, the second packet further includes a session identifier, and the session identifier is used by the second node to forward the second packet.

In an embodiment, the receiving unit 601 is further configured to perform operations S51, S56, and S60 in FIG. 8. The sending unit 602 is further configured to perform operations S53, S58, and S62 in FIG. 8.

In an embodiment, the session identifier is used by the second node to perform load balancing.

In an embodiment, the session identifier includes the source address of the first packet; or
the session identifier includes a first application-aware identifier corresponding to the second packet.

In an embodiment, when the session identifier includes the first application-aware identifier, the first packet further includes the first application-aware identifier.

In an embodiment, the second packet is an internet protocol version 6 IPv6 packet, and the session identifier is in an extension header of the second packet; or
the second packet is an internet protocol version 4 IPv4 packet, and the session identifier is in an option field of the second packet.

In an embodiment, the extension header is a hop-by-hop options HBH header or a newly added extension header.

Figure 14:
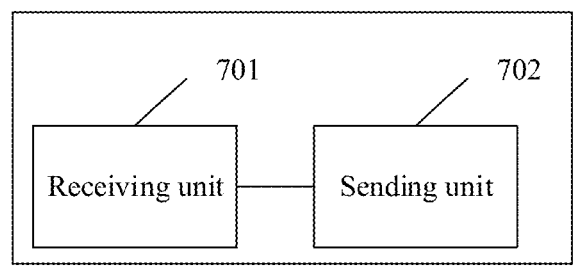
FIG. 14 is a block diagram of a packet forwarding apparatus according to an embodiment of this application.

FIG. 14 is a block diagram of a packet forwarding apparatus according to an embodiment of this application. The packet forwarding apparatus may be implemented as all or a part of a second node by using software, hardware, or a combination thereof. The second node is the second node in the application scenario shown in FIG. 4 or FIG. 5. The packet forwarding apparatus may include a receiving unit 701 and a sending unit 702.

The receiving unit 701 is configured to perform operation S41 in FIG. 7. To be specific, the receiving unit 701 is configured to receive a first packet from a first node, where the first packet includes a first session identifier.

The sending unit 702 is configured to perform operation S42 in FIG. 7. To be specific, the sending unit 702 is configured to send the first packet based on the first session identifier.

In an embodiment, the receiving unit 701 is further configured to perform operations S53, S58, and S62 in FIG. 8. The sending unit 702 is further configured to perform operations S55, S59, and S63 in FIG. 8.

In an embodiment, the first session identifier is used by the second node to perform load balancing.

In an embodiment, a source address of the first packet is obtained by translating a source address of a second packet, a destination address of the first packet is a destination address of the second packet, and a packet payload of the first packet is a packet payload of the second packet; and
the first session identifier includes the source address of the second packet; or
the first session identifier includes a first application-aware identifier corresponding to the first packet.

In an embodiment, when the first session identifier includes the source address of the second packet, the first session identifier further includes the destination address of the second packet;
the first session identifier further includes the destination address of the second packet and a source port of the second packet; or
the first session identifier further includes the destination address of the second packet, a source port of the second packet, and a destination port of the second packet.

In an embodiment, the first packet received by the second node is an IPv6 packet, and the first session identifier is in an extension header of the first packet; or
the first packet received by the first node is an IPv4 packet, and the first session identifier is in an option field of the first packet.

In an embodiment, the sending unit 702 is configured to generate a session table based on the first session identifier, where the session table includes a key value and next-hop information, and the key value includes the first session identifier; and find the next-hop information based on the key value corresponding to the first session identifier, and send the first packet based on the next-hop information.

In an embodiment, the second node is an ingress router in compute first networking, and the sending unit 702 is configured to: obtain, by the second node, computing power information of a plurality of third nodes that each provide a first service and that are in the compute first networking, where the first service is a service corresponding to the first packet; determine a target node in the plurality of third nodes based on the computing power information of the plurality of third nodes, where the target node satisfies a computing power condition; determine the next-hop information based on the target node, where the next-hop information is for sending a packet to the target node; and generate the session table based on the next-hop information and the first session identifier.

In an embodiment, the second node is a load balancer node in load balancing networking, and the sending unit 702 is configured to: obtain load information of a plurality of third nodes that each provide a first service and that are in the load balancing networking, where the first service is a service corresponding to the first packet; determine a target node in the plurality of third nodes based on the load information of the plurality of third nodes, where the target node satisfies a load condition; determine the next-hop information based on the target node, where the next-hop information is for sending a packet to the target node; and generate the session table based on the next-hop information and the first session identifier.

In an embodiment, the first packet sent by the second node includes the first session identifier.

In an embodiment, the receiving unit 701 is further configured to receive a third packet from the first node, where the third packet includes the first session identifier; and
the sending unit 702 is further configured to send, based on the first session identifier, the third packet to a destination node that is the same as that of the first packet.

In an embodiment, the receiving unit 701 is further configured to receive a fourth packet from the first node, where the fourth packet includes a second session identifier, and the second session identifier is different from the first session identifier; and
the sending unit 702 is further configured to send the fourth packet based on the second session identifier, so that the fourth packet and the first packet are sent to different serving nodes.

It should be noted that, when the packet forwarding apparatus provided in the foregoing embodiment works, division into the foregoing functional units is merely used as an example for description. During actual application, the foregoing functions may be allocated to different functional units for implementation as required. That is, an internal structure of the device is divided into different functional units, to implement all or some of the foregoing functions. In addition, the packet forwarding apparatus provided in the foregoing embodiment and the packet forwarding method embodiment belong to a same concept. For a specific implementation process of the packet forwarding apparatus provided in the foregoing embodiment, refer to the method embodiment. Details are not described herein again.

The descriptions of procedures corresponding to the foregoing accompanying drawings have respective focuses. For a part that is not described in detail in a procedure, refer to related descriptions of another procedure.

Figure 15:
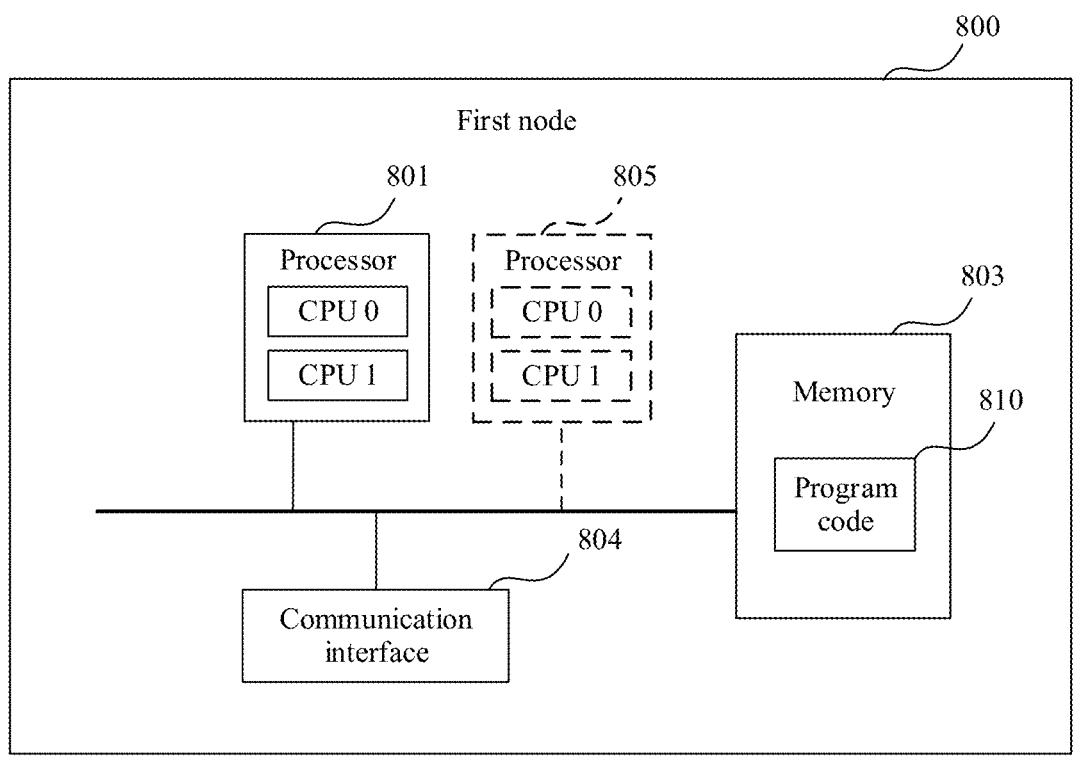
FIG. 15 is a block diagram of a first node according to an embodiment of this application.

FIG. 15 is a schematic diagram of a structure of a first node 800 according to an example embodiment of this application. The first node 800 shown in FIG. 15 is configured to perform the operations in the packet forwarding methods shown in FIG. 6 and FIG. 8. The first node 800 is, for example, a translation node. The first node 800 may be implemented by using a general bus architecture.

As shown in FIG. 15, the first node 800 includes at least one processor 801, a memory 803, and at least one communication interface 804.

The processor 801 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 801 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor 801 may implement or execute various logical blocks, modules, and circuits described with reference to content disclosed in this embodiment of the present invention. The processor may alternatively be a combination of processors implementing a computing function, for example, a combination of one or more microprocessors or a combination of the DSP and a microprocessor.

In an embodiment, the first node 800 further includes a bus. The bus is configured to transmit information between components of the first node 800. The bus may be a peripheral component interconnect (PCI) bus, an extended industry standard architecture (EISA) bus, or the like. Buses may be classified into an address bus, a data bus, a control bus, and the like. For ease of representation, only one thick line is for representing the bus in FIG. 15, but this does not mean that there is only one bus or only one type of bus.

The memory 803 is, for example, a read-only memory (ROM) or another type of static storage device that can store static information and instructions, a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be for carrying or storing expected program code in a form of instructions or a data structure and that can be accessed by a computer. However, the memory 803 is not limited thereto. For example, the memory 803 exists independently, and is connected to the processor 801 through the bus. Alternatively, the memory 803 and the processor 801 may be integrated together.

The communication interface 804 is any transceiver-type apparatus, and is configured to communicate with another device or a communication network. The communication network may be the Ethernet, a radio access network (RAN), a wireless local area network (WLAN), or the like. The communication interface 804 may include a wired communication interface, and may further include a wireless communication interface. Specifically, the communication interface 804 may be an Ethernet (Ethernet) interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 804 may be used by the first node 800 to communicate with another device.

During specific implementation, in an embodiment, the processor 801 may include one or more CPUs, for example, a CPU 0 and a CPU 1 shown in FIG. 15. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the first node 800 may include a plurality of processors, for example, the processor 801 and a processor 805 in FIG. 15. Each of the processors may be a single-core processor (single-CPU), or may be a multi-core processor (multi-CPU). The processor herein may be one or more devices, circuits, and/or processing cores configured to process data (for example, computer program instructions).

During specific implementation, in an embodiment, the first node 800 may further include an output device and an input device. The output device communicates with the processor 801, and may display information in a plurality of manners. For example, the output device may be a liquid crystal display (LCD), a light emitting diode (LED) display device, a cathode ray tube (CRT) display device, or a projector (projector). The input device communicates with the processor 801, and may receive an input from a user in a plurality of manners. For example, the input device may be a mouse, a keyboard, a touchscreen device, or a sensor device.

In some embodiments, the memory 803 is configured to store program code 810 for executing the solutions of this application, and the processor 801 may execute the program code 810 stored in the memory 803. In other words, the first node 800 may implement, by using the processor 801 and the program code 810 in the memory 803, the packet forwarding method provided in the method embodiments. The program code 810 may include one or more software modules. In an embodiment, the processor 801 may alternatively store program code or instructions for executing the solutions of this application.

In a specific embodiment, the first node 800 in this embodiment of this application may correspond to the first network device in the foregoing method embodiments. The processor 801 in the first node 800 reads instructions in the memory 803, so that the first node 800 shown in FIG. 15 can perform all or some operations performed by the first network device.

Specifically, the processor 801 is configured to: send a probe packet to at least one remote server by using the communication interface, where the probe packet includes a DHCP packet or a DHCPv6 packet; and determine a status of the at least one remote server based on a response status of the at least one remote server.

For brevity, other optional implementations are not described herein again.

For another example, the first node 800 in this embodiment of this application may correspond to the second network device in the foregoing method embodiments. The processor 801 in the first node 800 reads instructions in the memory 803, so that the first node 800 shown in FIG. 15 can perform all or some operations performed by the second network device.

Specifically, the processor 801 is configured to receive, through the communication interface, indication information sent by a first network device; and determine a status of at least one remote server based on the indication information.

For brevity, other optional implementations are not described herein again.

The first node 800 may alternatively correspond to the packet forwarding apparatus shown in FIG. 13, and each functional module in the packet forwarding apparatus is implemented by using software of the first node 800. In other words, the functional modules included in the packet forwarding apparatus are generated by the processor 801 in the first node 800 by reading the program code 810 stored in the memory 803.

The operations of the packet forwarding methods shown in FIG. 6 and FIG. 8 are completed by using a hardware integrated logical circuit in the processor in the first node 800 or by using instructions in a form of software. The operations of the methods disclosed with reference to embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory, and completes the operations of the foregoing methods in combination with hardware of the processor. To avoid repetition, details are not described herein again.

Figure 16:
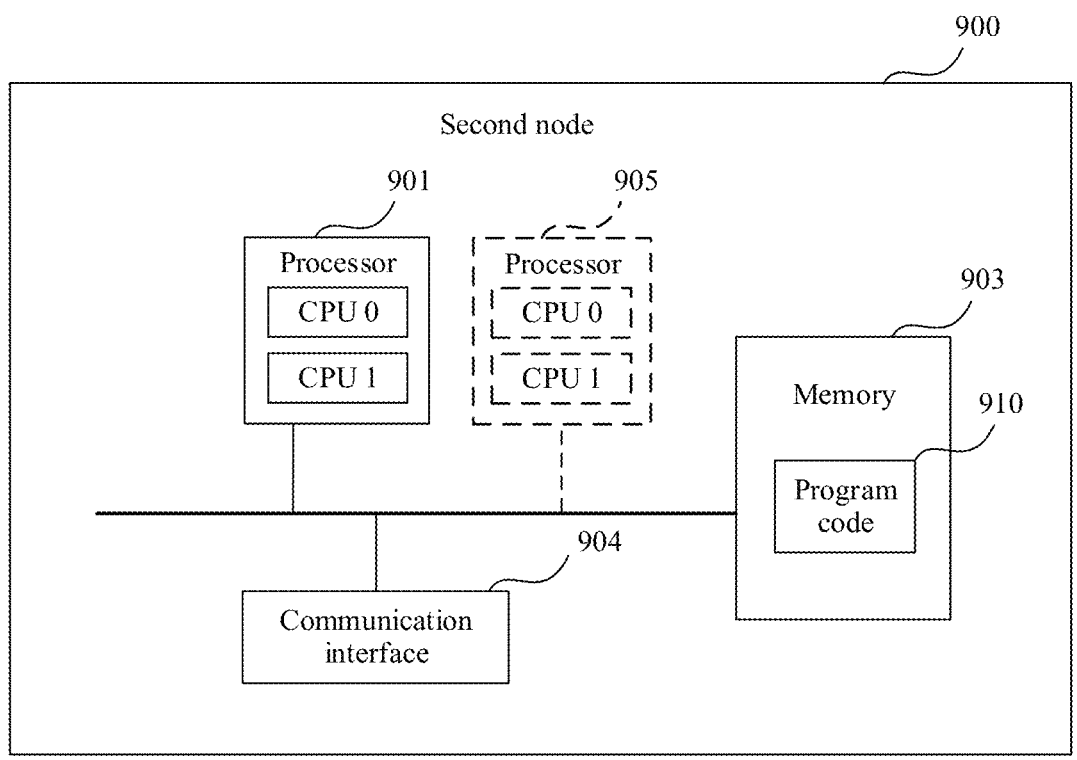
FIG. 16 is a block diagram of a second node according to an embodiment of this application.

FIG. 16 is a schematic diagram of a structure of a second node 900 according to an example embodiment of this application. The second node 900 shown in FIG. 16 is configured to perform the operations in the packet forwarding methods shown in FIG. 7 and FIG. 8. The second node 900 is, for example, a router or a switch. The second node 900 may be implemented by using a general bus architecture.

As shown in FIG. 16, the second node 900 includes at least one processor 901, a memory 903, and at least one communication interface 904.

The processor 901 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 901 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor 901 may implement or execute various logical blocks, modules, and circuits described with reference to content disclosed in this embodiment of the present invention. The processor may alternatively be a combination of processors implementing a computing function, for example, a combination of one or more microprocessors or a combination of the DSP and a microprocessor.

In an embodiment, the second node 900 further includes a bus. The bus is configured to transmit information between components of the second node 900. The bus may be a peripheral component interconnect (PCI) bus, an extended industry standard architecture (EISA) bus, or the like. Buses may be classified into an address bus, a data bus, a control bus, and the like. For ease of representation, only one thick line is for representing the bus in FIG. 16, but this does not mean that there is only one bus or only one type of bus.

The memory 903 is, for example, a read-only memory (ROM) or another type of static storage device that can store static information and instructions, a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be for carrying or storing expected program code in a form of instructions or a data structure and that can be accessed by a computer. However, the memory 903 is not limited thereto. For example, the memory 903 exists independently, and is connected to the processor 901 through the bus. Alternatively, the memory 903 and the processor 901 may be integrated together.

The communication interface 904 is any transceiver-type apparatus, and is configured to communicate with another device or a communication network. The communication network may be the Ethernet, a radio access network (RAN), a wireless local area network (WLAN), or the like. The communication interface 904 may include a wired communication interface, and may further include a wireless communication interface. Specifically, the communication interface 904 may be an Ethernet (Ethernet) interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 904 may be used by the second node 900 to communicate with another device.

During specific implementation, in an embodiment, the processor 901 may include one or more CPUs, for example, a CPU 0 and a CPU 1 shown in FIG. 16. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the second node 900 may include a plurality of processors, for example, the processor 901 and a processor 905 in FIG. 16. Each of the processors may be a single-core processor (single-CPU) or may be a multi-core processor (multi-CPU). The processor herein may be one or more devices, circuits, and/or processing cores configured to process data (for example, computer program instructions).

During specific implementation, in an embodiment, the second node 900 may further include an output device and an input device. The output device communicates with the processor 901, and may display information in a plurality of manners. For example, the output device may be a liquid crystal display (LCD), a light emitting diode (LED) display device, a cathode ray tube (CRT) display device, or a projector (projector). The input device communicates with the processor 901, and may receive an input from a user in a plurality of manners. For example, the input device may be a mouse, a keyboard, a touchscreen device, or a sensor device.

In some embodiments, the memory 903 is configured to store program code 910 for executing the solutions of this application, and the processor 901 may execute the program code 910 stored in the memory 903. In other words, the second node 900 may implement, by using the processor 901 and the program code 910 in the memory 903, the packet forwarding method provided in the method embodiments. The program code 910 may include one or more software modules. In an embodiment, the processor 901 may alternatively store program code or instructions for executing the solutions of this application.

In a specific embodiment, the second node 900 in this embodiment of this application may correspond to the first network device in the foregoing method embodiments. The processor 901 in the second node 900 reads instructions in the memory 903, so that the second node 900 shown in FIG. 16 can perform all or some operations performed by the first network device.

Specifically, the processor 901 is configured to: send a probe packet to at least one remote server by using the communication interface, where the probe packet includes a DHCP packet or a DHCPv6 packet; and determine a status of the at least one remote server based on a response status of the at least one remote server.

For brevity, other optional implementations are not described herein again.

For another example, the second node 900 in this embodiment of this application may correspond to the second network device in the foregoing method embodiments. The processor 901 in the second node 900 reads instructions in the memory 903, so that the second node 900 shown in FIG. 16 can perform all or some operations performed by the second network device.

Specifically, the processor 901 is configured to receive, through the communication interface, indication information sent by a first network device; and determine a status of at least one remote server based on the indication information.

For brevity, other optional implementations are not described herein again.

The second node 900 may alternatively correspond to the packet forwarding apparatus shown in FIG. 14, and each functional module in the packet forwarding apparatus is implemented by using software of the second node 900. In other words, the functional modules included in the packet forwarding apparatus are generated by the processor 901 in the second node 900 by reading the program code 910 stored in the memory 903.

The operations of the packet forwarding methods shown in FIG. 7 and FIG. 8 are completed by using a hardware integrated logical circuit in the processor in the second node 900 or by using instructions in a form of software. The operations of the methods disclosed with reference to embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory, and completes the operations of the foregoing methods in combination with hardware of the processor. To avoid repetition, details are not described herein again.

An embodiment of this application further provides a chip, including a processor. The processor is configured to invoke instructions from a memory, and run the instructions stored in the memory, so that a communication device on which the chip is installed performs any packet forwarding method provided in this application.

An embodiment of this application further provides a chip, including an input interface, an output interface, a processor, and a memory. The input interface, the output interface, the processor, and the memory are connected to each other through an internal connection path. The processor is configured to execute code in the memory. When the code is executed, the processor is configured to perform any one of the foregoing packet forwarding methods.

It should be understood that the processor may be a CPU, or may be another general purpose processor, a DSP, an ASIC, an FPGA or another programmable logic device, a discrete gate or a transistor logic device, a discrete hardware component, or the like. The general purpose processor may be a microprocessor, any conventional processor, or the like. It should be noted that the processor may be a processor that supports an ARM architecture.

Further, in an optional embodiment, there are one or more processors and one or more memories. In an embodiment, the memory and the processor may be integrated together, or the memory and the processor may be separately disposed. The memory may include a read-only memory and a random access memory, and provide instructions and data to the processor. The memory may further include a non-volatile random access memory. For example, the memory may further store a reference block and a target block.

The memory may be a volatile memory or a nonvolatile memory, or may include the volatile memory and the nonvolatile memory. The nonvolatile memory may be a ROM, a PROM, an EPROM, an EEPROM, or a flash memory. The volatile memory may be a RAM, and may serve as an external cache. By way of example but not limitation description, RAMs in many forms are available, for example, an SRAM, a DRAM, an SDRAM, a DDR SDRAM, an ESDRAM, an SLDRAM, and a DR RAM.

An embodiment of this application further provides a computer-readable storage medium. The computer-readable storage medium stores computer instructions. When the computer instructions stored in the computer-readable storage medium are executed by a computer device, the computer device is enabled to perform the packet forwarding method provided above.

An embodiment of this application further provides a computer program product including instructions. When the computer program product runs on a computer device, the computer device is enabled to perform the packet forwarding method provided above.

All or some of the foregoing embodiments may be implemented by using software, hardware, firmware, or any combination thereof. When software is used for implementation, embodiments may be implemented completely or partially in a form of a computer program product. The computer program product includes one or more computer instructions. When the computer program instructions are loaded and executed on a computer, the procedure or functions according to this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to a computer or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk), or the like.

A person of ordinary skill in the art may understand that all or some of the operations of the foregoing embodiments may be implemented by hardware or by a program instructing related hardware. The program may be stored in a computer-readable storage medium. The foregoing storage medium may be a read-only memory, a magnetic disk, an optical disc, or the like.

The foregoing descriptions are merely optional embodiments of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A packet forwarding method, comprising:
receiving, by a second node, a first packet from a first node, wherein the first packet comprises a first session identifier; and
sending, by the second node, the first packet based on the first session identifier comprising:
generating, by the second node, a session table based on the first session identifier, wherein the session table comprises a key value and next-hop information, and the key value comprises the first session identifier, and
finding, by the second node, the next-hop information based on the key value corresponding to the first session identifier, and sending the first packet based on the next-hop information.

2. The packet forwarding method according to claim 1, wherein the first session identifier is used by the second node to perform load balancing.

3. The packet forwarding method according to claim 1, wherein a source address of the first packet is obtained by translating a source address of a second packet, a destination address of the first packet is a destination address of the second packet, and a packet payload of the first packet is a packet payload of the second packet; and
the first session identifier comprises the source address of the second packet; or
the first session identifier comprises a first application-aware identifier corresponding to the first packet.

4. The packet forwarding method according to claim 1, wherein the first packet received by the second node is an IPv6 packet, and the first session identifier is in an extension header of the first packet; or
the first packet received by the first node is an IPv4 packet, and the first session identifier is in an option field of the first packet.

5. The packet forwarding method according to claim 1, wherein the second node is an ingress router in compute first networking, and the generating, by the second node, a session table based on the first session identifier comprises:
obtaining, by the second node, computing power information of a plurality of third nodes that each provide a first service and that are in the compute first networking, wherein the first service is a service corresponding to the first packet;
determining, by the second node, a target node in the plurality of third nodes based on the computing power information of the plurality of third nodes, wherein the target node satisfies a computing power condition;
determining, by the second node, the next-hop information based on the target node, wherein the next-hop information is for sending a packet to the target node; and
generating, by the second node, the session table based on the next-hop information and the first session identifier.

6. The packet forwarding method according to claim 1, wherein the second node is a load balancer node in load balancing networking, and the generating, by the second node, a session table based on the first session identifier comprises:
obtaining, by the second node, load information of a plurality of third nodes that each provide a first service and that are in the load balancing networking, wherein the first service is a service corresponding to the first packet;
determining, by the second node, a target node in the plurality of third nodes based on the load information of the plurality of third nodes, wherein the target node satisfies a load condition;
determining, by the second node, the next-hop information based on the target node, wherein the next-hop information is for sending a packet to the target node; and
generating, by the second node, the session table based on the next-hop information and the first session identifier.

7. The packet forwarding method according to claim 1, wherein the first packet sent by the second node comprises the first session identifier.

8. The packet forwarding method according to claim 1, wherein the method further comprises:
receiving, by the second node, a third packet from the first node, wherein the third packet comprises the first session identifier; and
sending, by the second node based on the first session identifier, the third packet to a destination node that is the same as that of the first packet.

9. The packet forwarding method according to claim 1, wherein the method further comprises:
receiving, by the second node, a fourth packet from the first node, wherein the fourth packet comprises a second session identifier, and the second session identifier is different from the first session identifier; and
sending, by the second node, the fourth packet based on the second session identifier, so that the fourth packet and the first packet are sent to different serving nodes.

10. A computer processing system, comprising:
a memory storing one or more instructions; and
a processor, coupled with the memory, configured to execute the one or more instructions causing the computer processing system to perform operations for a packet forwarding method, the operations comprising:
receiving, by a second node, a first packet from a first node, wherein the first packet comprises a first session identifier; and
sending, by the second node, the first packet based on the first session identifier comprising:
generating, by the second node, a session table based on the first session identifier, wherein the session table comprises a key value and next-hop information, and the key value comprises the first session identifier, and
finding, by the second node, the next-hop information based on the key value corresponding to the first session identifier, and sending the first packet based on the next-hop information.

11. The computer processing system of claim 10, wherein the first packet sent by the second node comprises the first session identifier.

12. The computer processing system of claim 10, wherein the operations further comprise:
receiving, by the second node, a third packet from the first node, wherein the third packet comprises the first session identifier; and sending, by the second node based on the first session identifier, the third packet to a destination node that is the same as that of the first packet.

13. The computer processing system of claim 10, wherein the operations further comprise:
    receiving, by the second node, a fourth packet from the first node, wherein the fourth packet comprises a second session identifier, and the second session identifier is different from the first session identifier; and
    sending, by the second node, the fourth packet based on the second session identifier, so that the fourth packet and the first packet are sent to different serving nodes.

14. The computer processing system of claim 10, wherein the second node is an ingress router in compute first networking, and the generating, by the second node, a session table based on the first session identifier comprises operations for:
    obtaining, by the second node, computing power information of a plurality of third nodes that each provide a first service and that are in the compute first networking, wherein the first service is a service corresponding to the first packet;
    determining, by the second node, a target node in the plurality of third nodes based on the computing power information of the plurality of third nodes, wherein the target node satisfies a computing power condition;
    determining, by the second node, the next-hop information based on the target node, wherein the next-hop information is for sending a packet to the target node; and
    generating, by the second node, the session table based on the next-hop information and the first session identifier.

15. The computer processing system of claim 10, wherein the second node is a load balancer node in load balancing networking, and the generating, by the second node, a session table based on the first session identifier comprises operations for:
    obtaining, by the second node, load information of a plurality of third nodes that each provide a first service and that are in the load balancing networking, wherein the first service is a service corresponding to the first packet;
    determining, by the second node, a target node in the plurality of third nodes based on the load information of the plurality of third nodes, wherein the target node satisfies a load condition;
    determining, by the second node, the next-hop information based on the target node, wherein the next-hop information is for sending a packet to the target node; and
    generating, by the second node, the session table based on the next-hop information and the first session identifier.

16. A non-transitory computer readable storage medium, having one or more instructions stored thereon, which when executed by a processor of a computer processing system, cause the computer processing system to perform operations for a packet forwarding method, the operations comprising:
    receiving, by a second node, a first packet from a first node, wherein the first packet comprises a first session identifier; and
    sending, by the second node, the first packet based on the first session identifier comprising:
    generating, by the second node, a session table based on the first session identifier, wherein the session table comprises a key value and next-hop information, and the key value comprises the first session identifier, and
    finding, by the second node, the next-hop information based on the key value corresponding to the first session identifier, and sending the first packet based on the next-hop information.

17. The non-transitory computer readable storage medium of claim 16, wherein the operations further comprise:
    receiving, by the second node, a third packet from the first node, wherein the third packet comprises the first session identifier; and
    sending, by the second node based on the first session identifier, the third packet to a destination node that is the same as that of the first packet.

18. The non-transitory computer readable storage medium of claim 16, wherein the operations further comprise:
    receiving, by the second node, a fourth packet from the first node, wherein the fourth packet comprises a second session identifier, and the second session identifier is different from the first session identifier; and
    sending, by the second node, the fourth packet based on the second session identifier, so that the fourth packet and the first packet are sent to different serving nodes.

19. The non-transitory computer readable storage medium of claim 16, wherein the second node is an ingress router in compute first networking, and the generating, by the second node, a session table based on the first session identifier comprises operations for:
    obtaining, by the second node, computing power information of a plurality of third nodes that each provide a first service and that are in the compute first networking, wherein the first service is a service corresponding to the first packet;
    determining, by the second node, a target node in the plurality of third nodes based on the computing power information of the plurality of third nodes, wherein the target node satisfies a computing power condition;
    determining, by the second node, the next-hop information based on the target node, wherein the next-hop information is for sending a packet to the target node; and
    generating, by the second node, the session table based on the next-hop information and the first session identifier.

20. The non-transitory computer readable storage medium of claim 16,
    wherein the second node is a load balancer node in load balancing networking, and the generating, by the second node, a session table based on the first session identifier comprises operations for:
    obtaining, by the second node, load information of a plurality of third nodes that each provide a first service and that are in the load balancing networking, wherein the first service is a service corresponding to the first packet;
    determining, by the second node, a target node in the plurality of third nodes based on the load information of the plurality of third nodes, wherein the target node satisfies a load condition;
    determining, by the second node, the next-hop information based on the target node, wherein the next-hop information is for sending a packet to the target node; and
    generating, by the second node, the session table based on the next-hop information and the first session identifier.

* * * * *